Figure 4:
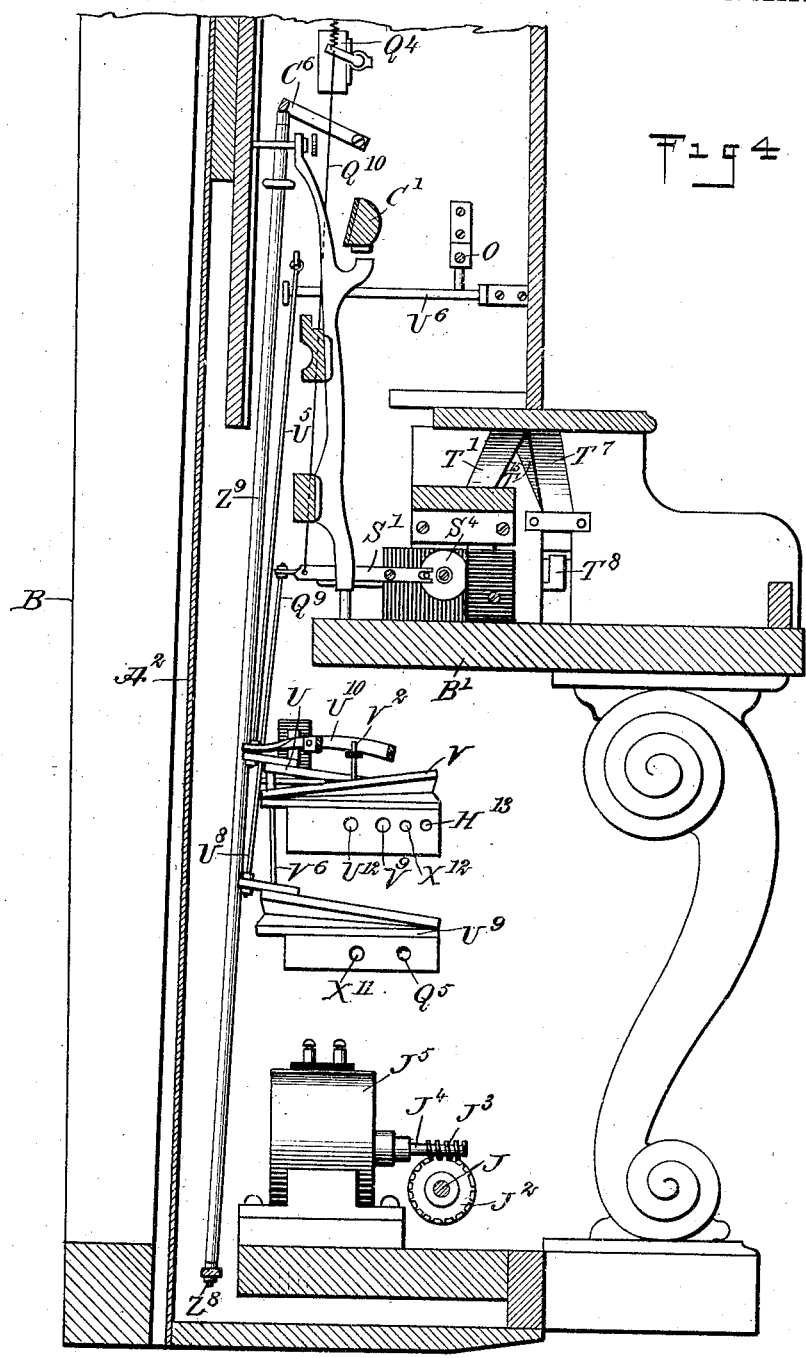

No. 846,419. PATENTED MAR. 5, 1907.
H. MEYER
REWINDING MECHANISM FOR SELF PLAYING PIANOS.
APPLICATION FILED DEC. 23, 1905.
17 SHEETS—SHEET 1.
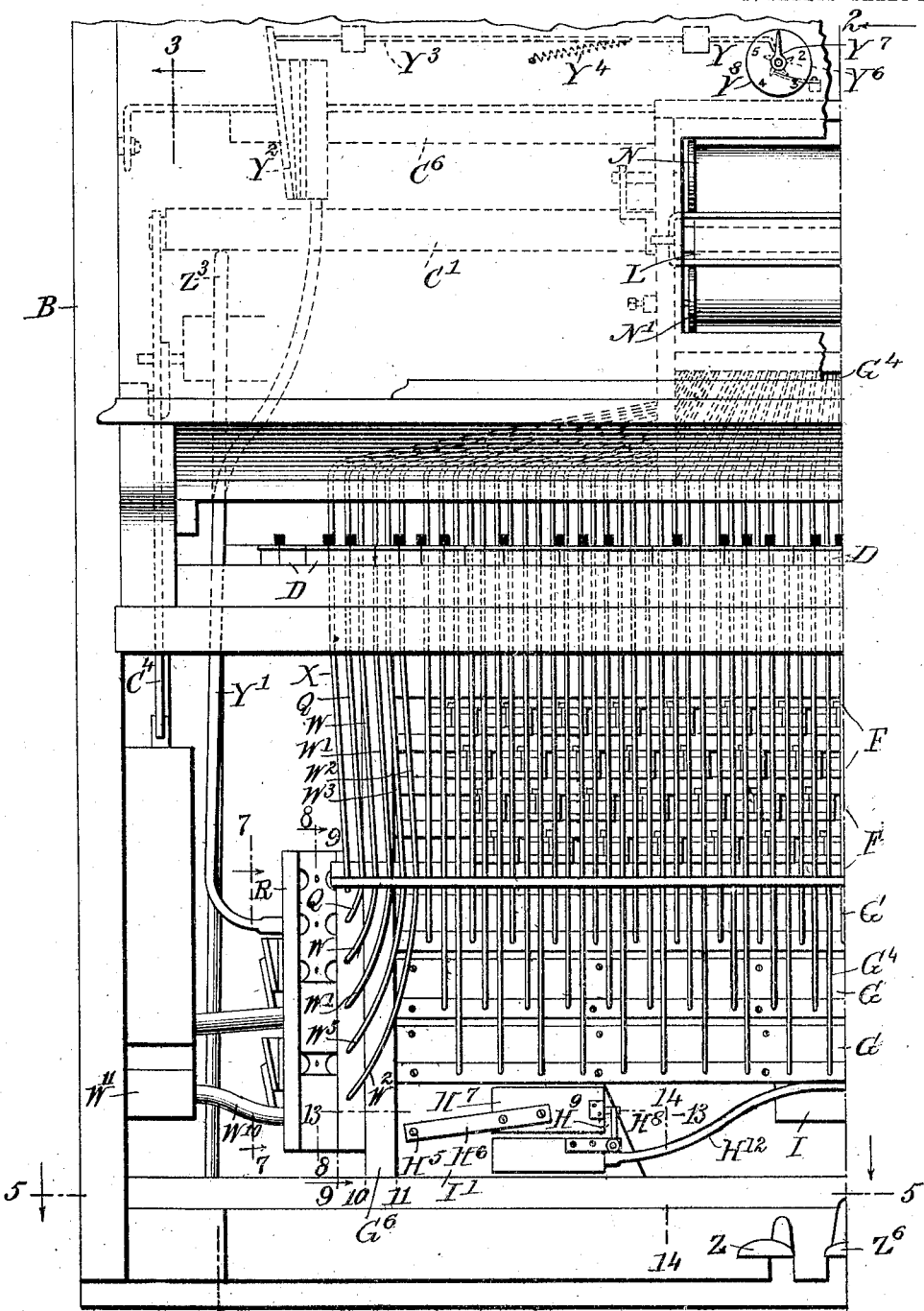
WITNESSES:
INVENTOR
Hermann Meyer
BY
ATTORNEYS

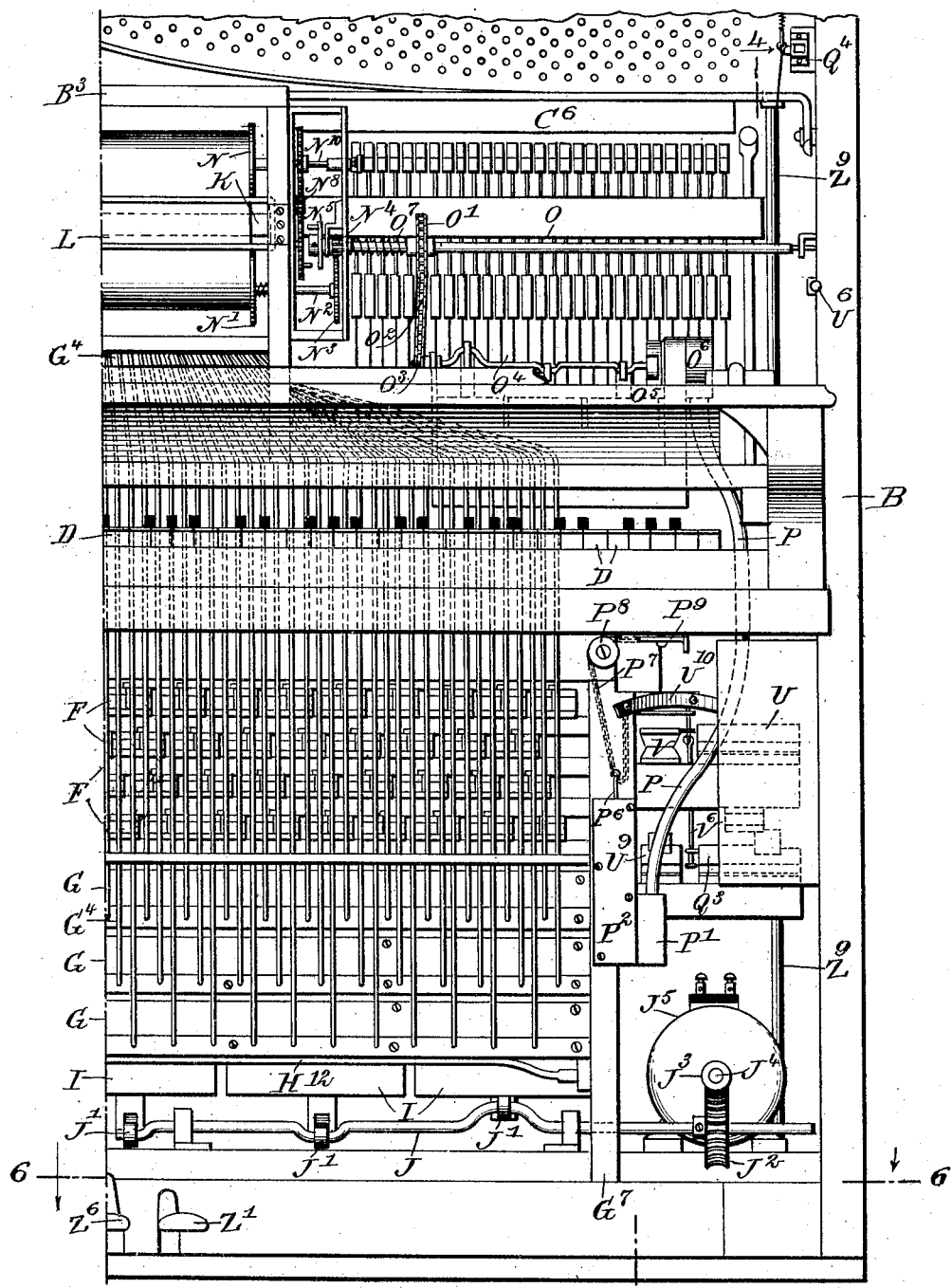

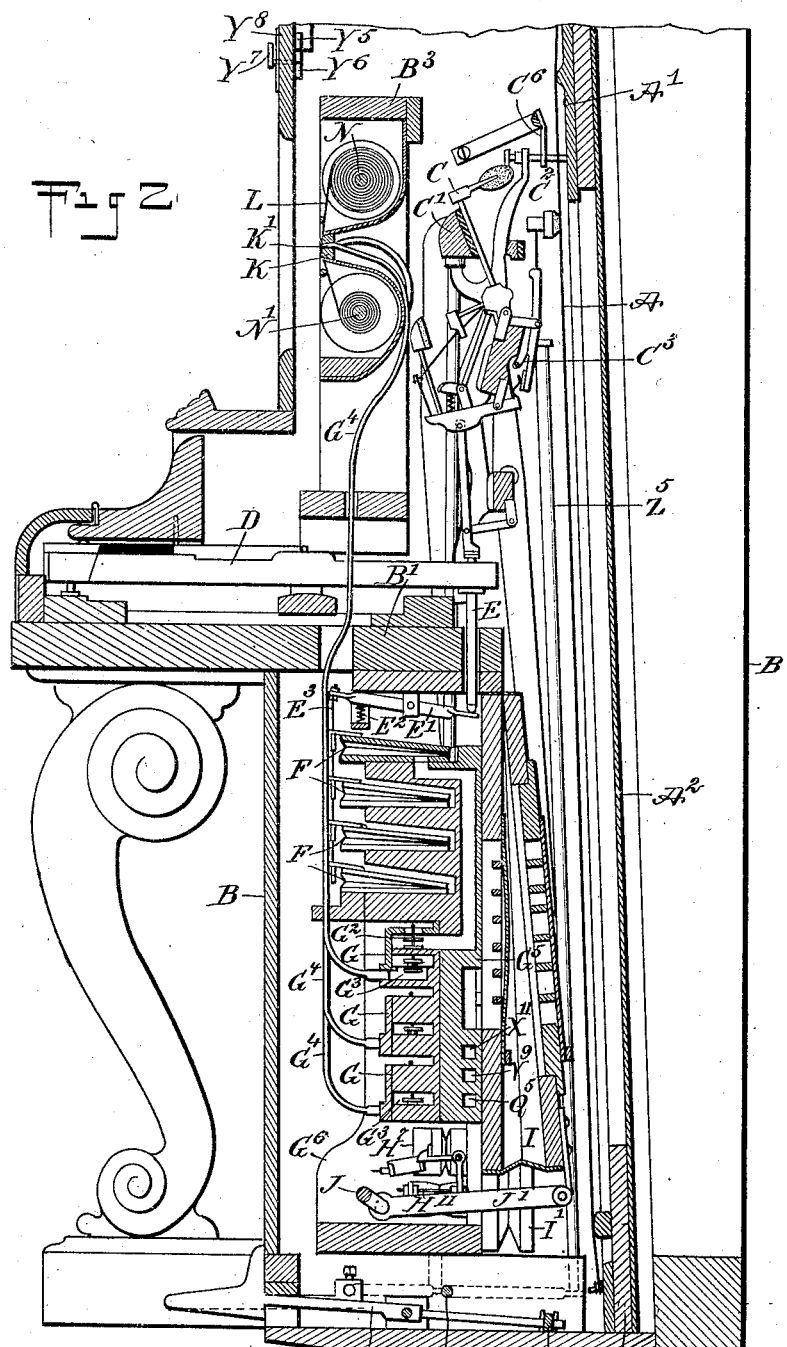

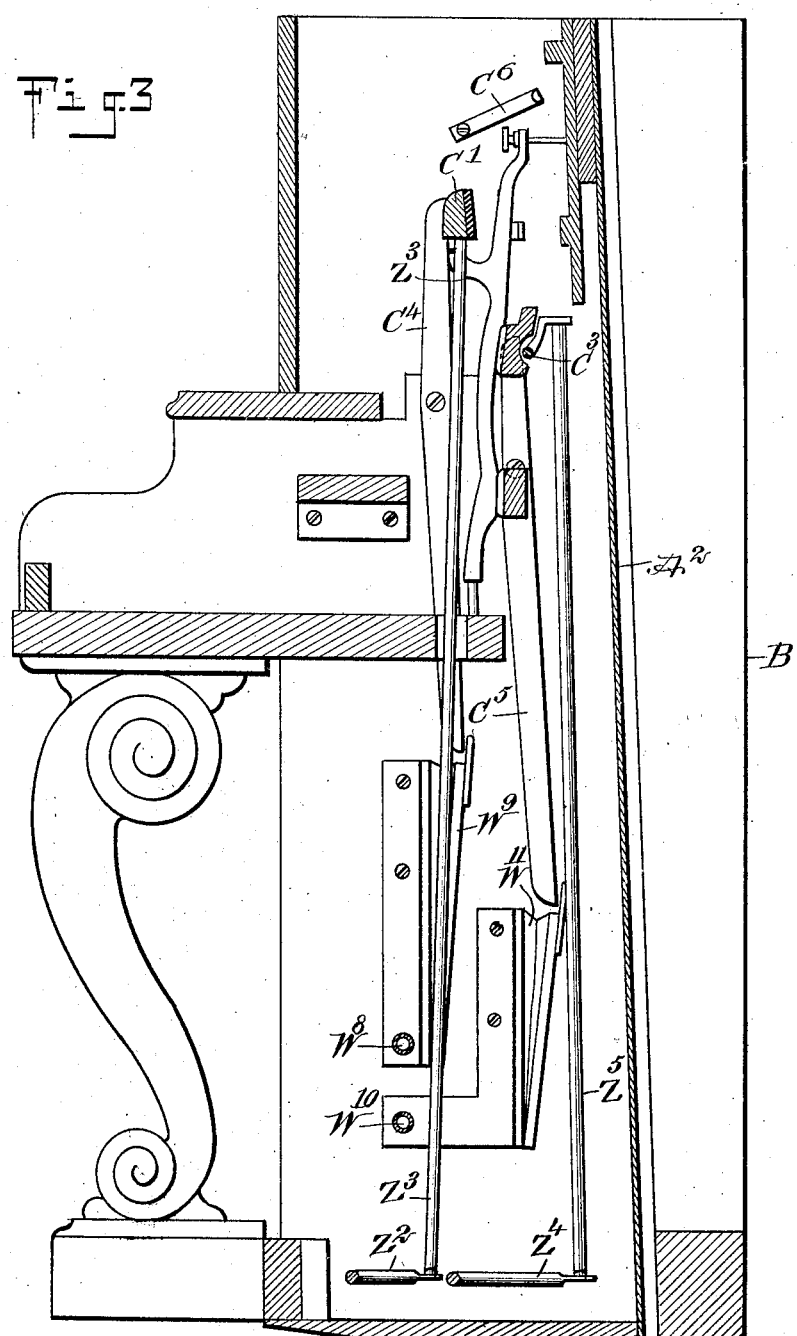

No. 846,419.

PATENTED MAR. 5, 1907.

H. MEYER.
REWINDING MECHANISM FOR SELF PLAYING PIANOS.
APPLICATION FILED DEC. 23, 1905.

17 SHEETS—SHEET 5.

WITNESSES:

INVENTOR
Hermann Meyer
BY
ATTORNEYS

No. 846,419. PATENTED MAR. 5, 1907.
H. MEYER.
REWINDING MECHANISM FOR SELF PLAYING PIANOS.
APPLICATION FILED DEC. 23, 1905.

17 SHEETS—SHEET 6.

WITNESSES:
INVENTOR
Hermann Meyer
BY
ATTORNEYS

No. 846,419. PATENTED MAR. 5, 1907.
H. MEYER.
REWINDING MECHANISM FOR SELF PLAYING PIANOS.
APPLICATION FILED DEC. 23, 1905.
17 SHEETS—SHEET 7.
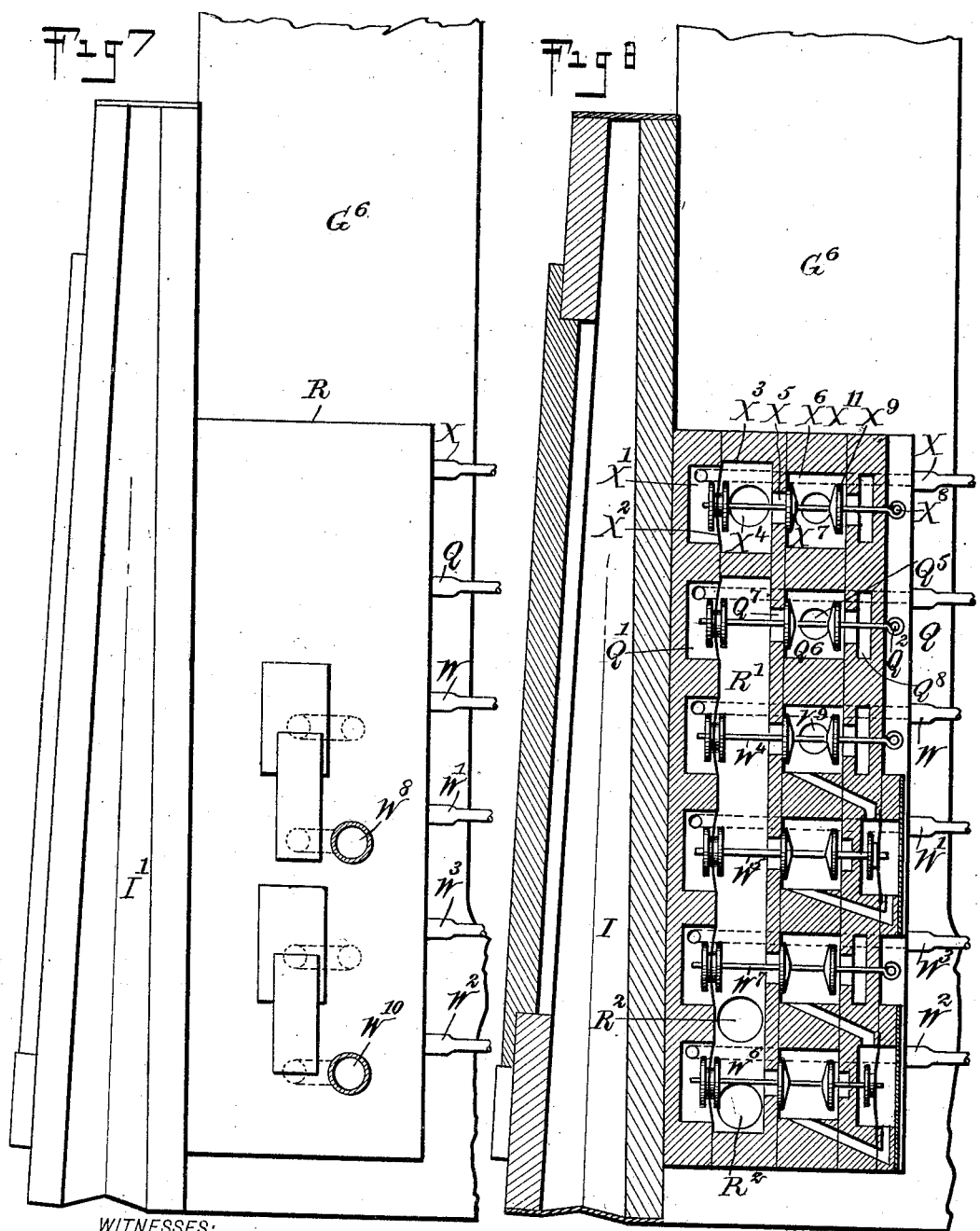
WITNESSES:
INVENTOR
Hermann Meyer
BY
ATTORNEYS

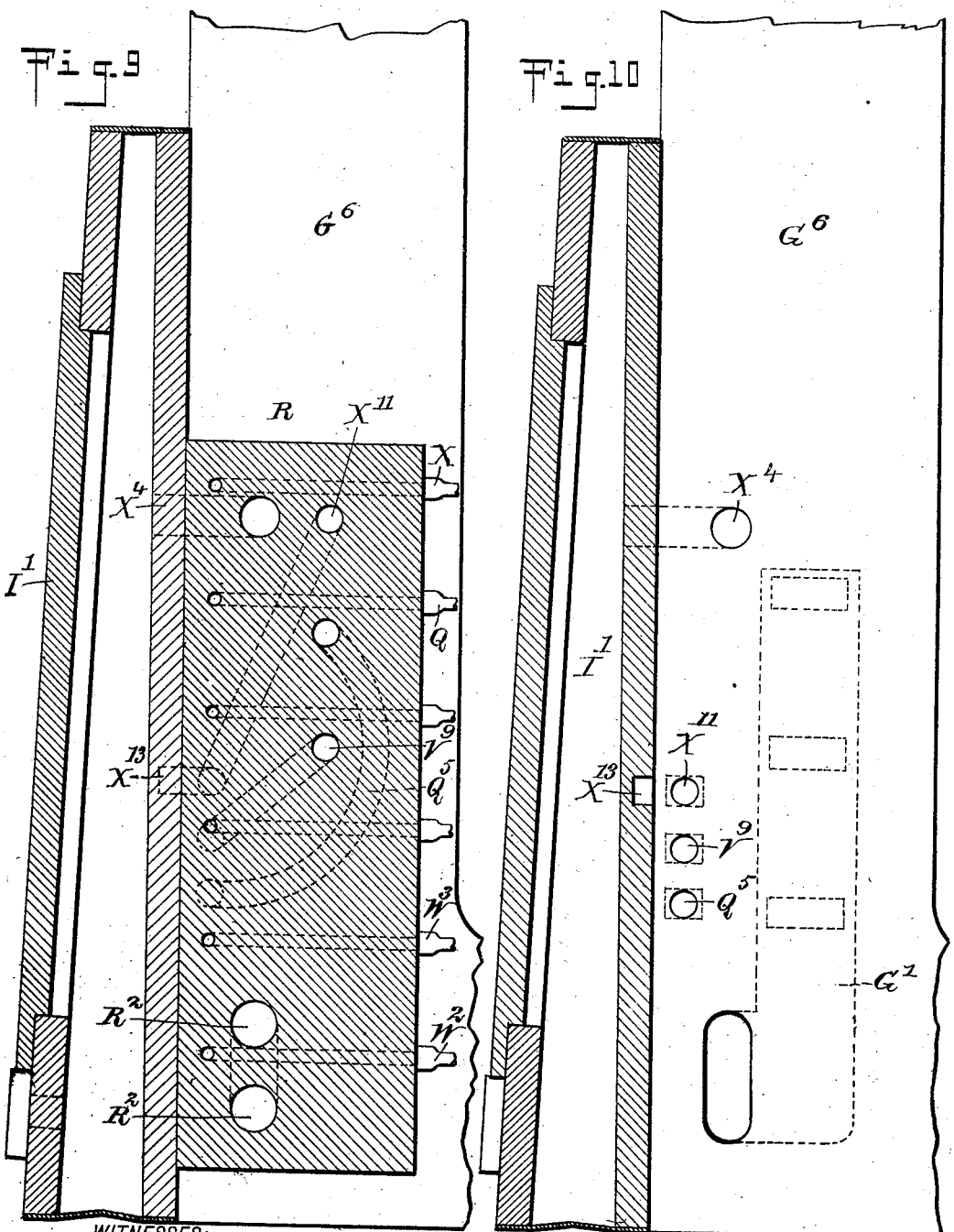

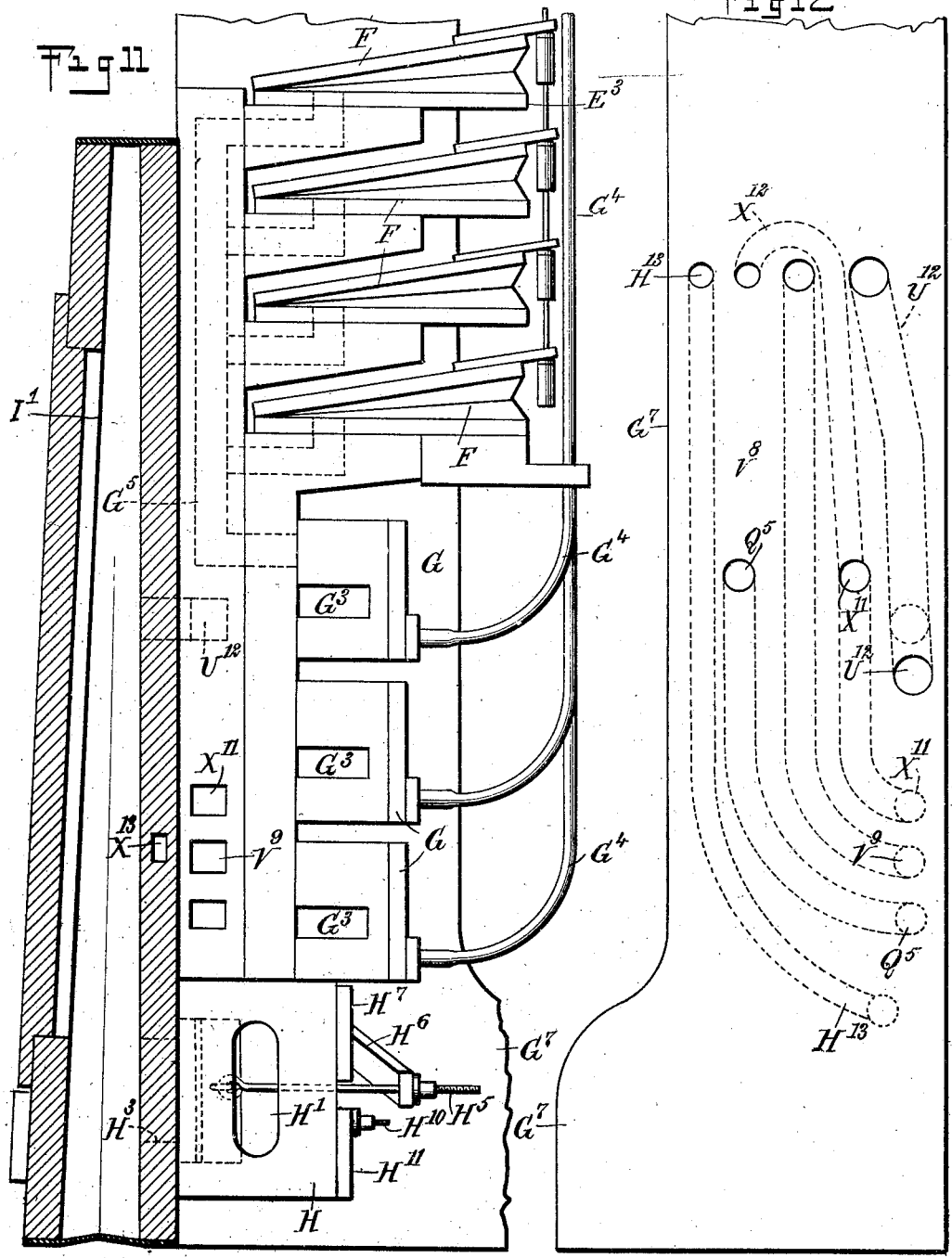

No. 846,419. PATENTED MAR. 5, 1907.
H. MEYER.
REWINDING MECHANISM FOR SELF PLAYING PIANOS.
APPLICATION FILED DEC. 23, 1905.

17 SHEETS—SHEET 10.

WITNESSES:
John J. Kittle
Geo. J. Hooker

INVENTOR
Hermann Meyer
BY
ATTORNEYS

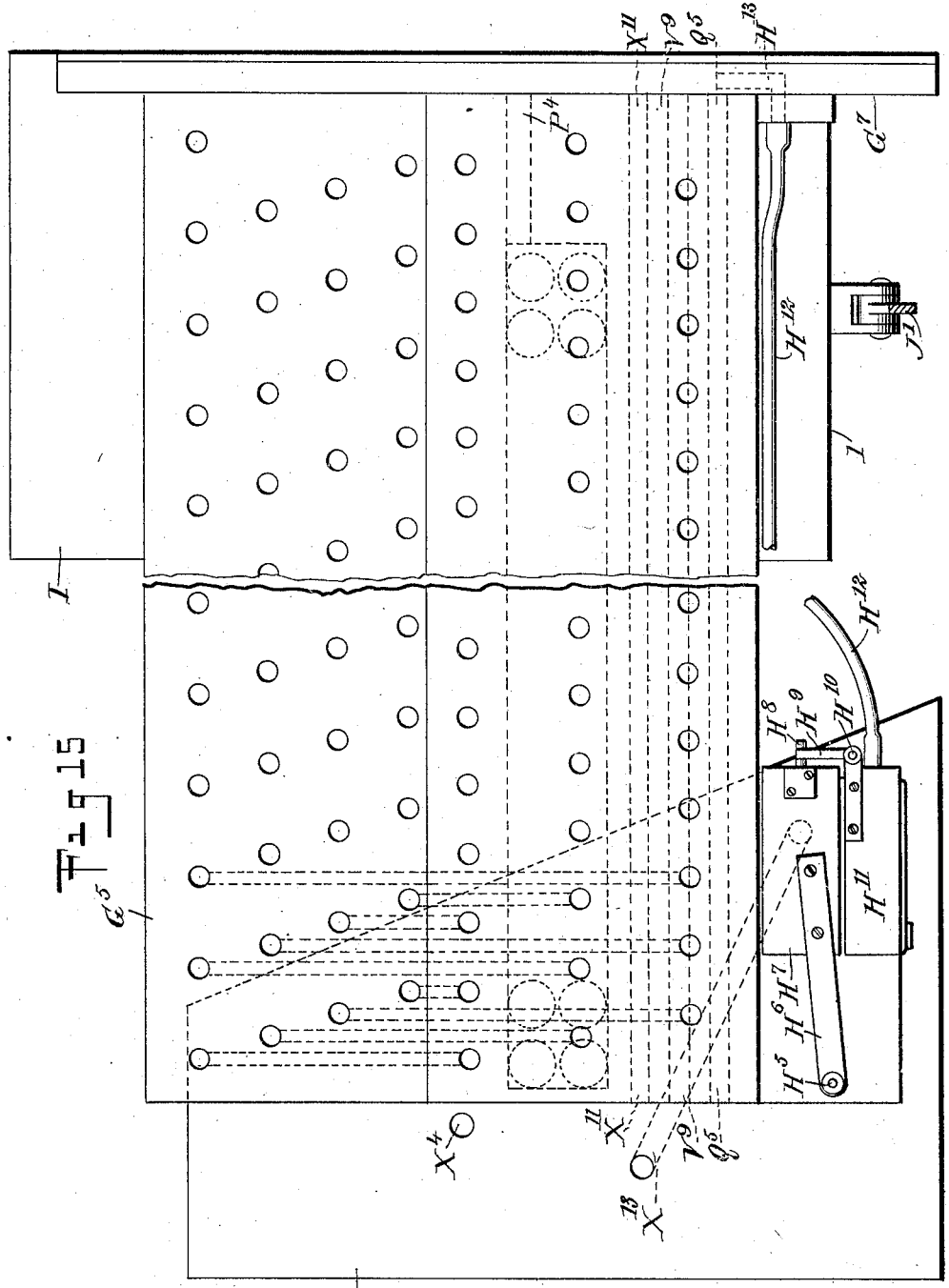

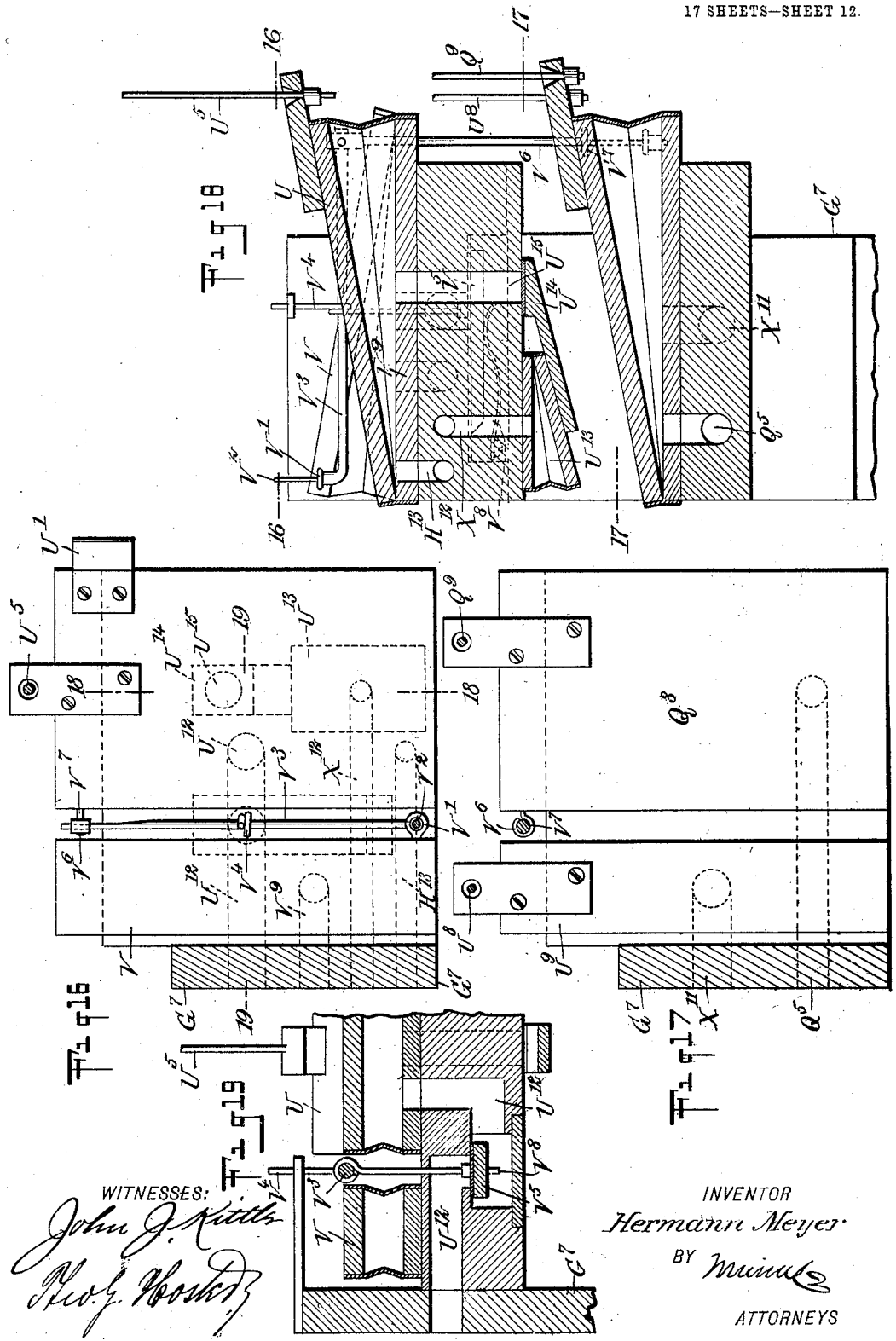

No. 846,419. PATENTED MAR. 5, 1907.
H. MEYER.
REWINDING MECHANISM FOR SELF PLAYING PIANOS.
APPLICATION FILED DEC. 23, 1905.

17 SHEETS—SHEET 13.

WITNESSES:

INVENTOR
Hermann Meyer
BY
ATTORNEYS

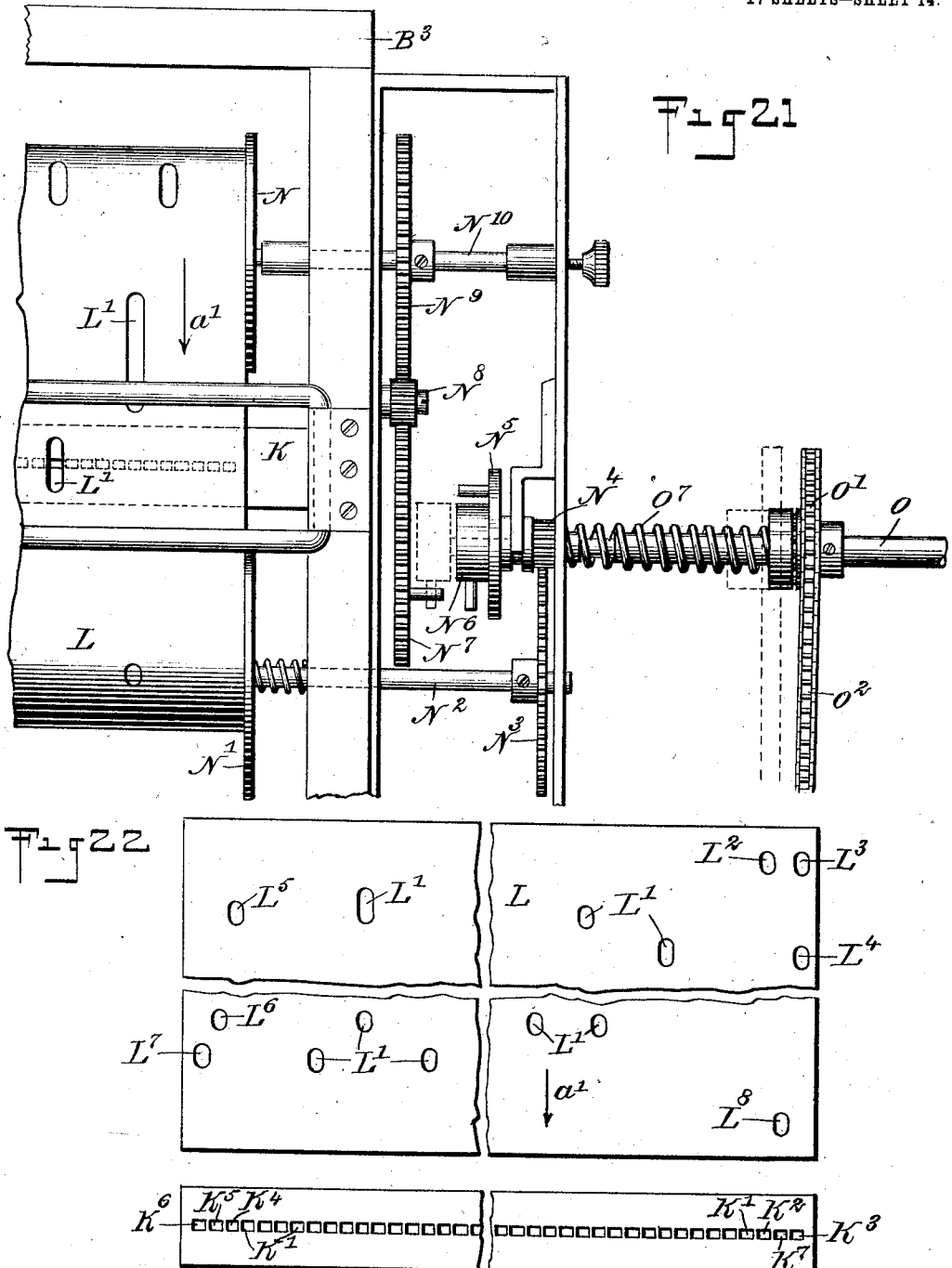

No. 846,419. PATENTED MAR. 5, 1907.
H. MEYER.
REWINDING MECHANISM FOR SELF PLAYING PIANOS.
APPLICATION FILED DEC. 23, 1905.
17 SHEETS—SHEET 15
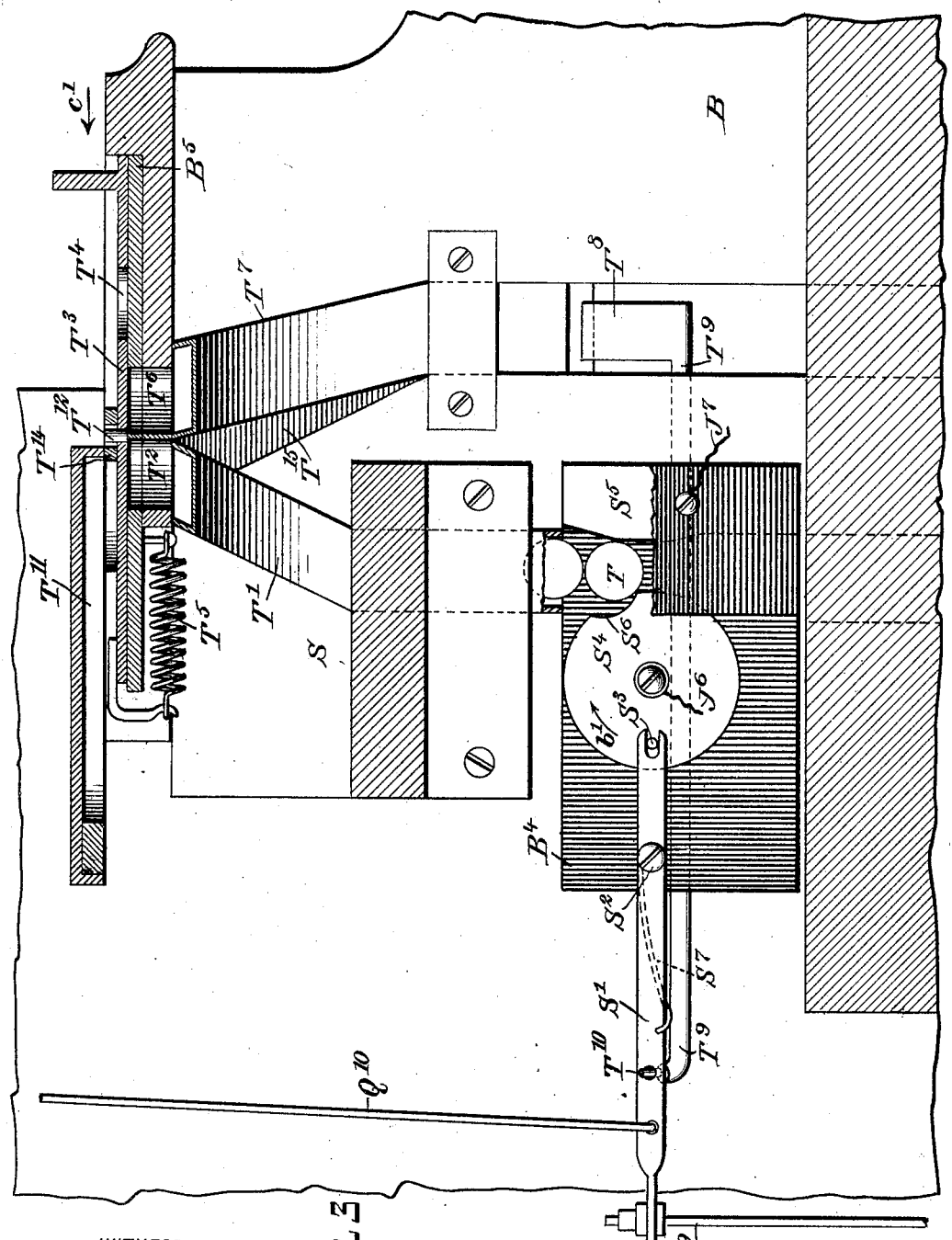
WITNESSES:
INVENTOR
Hermann Meyer
BY
ATTORNEYS

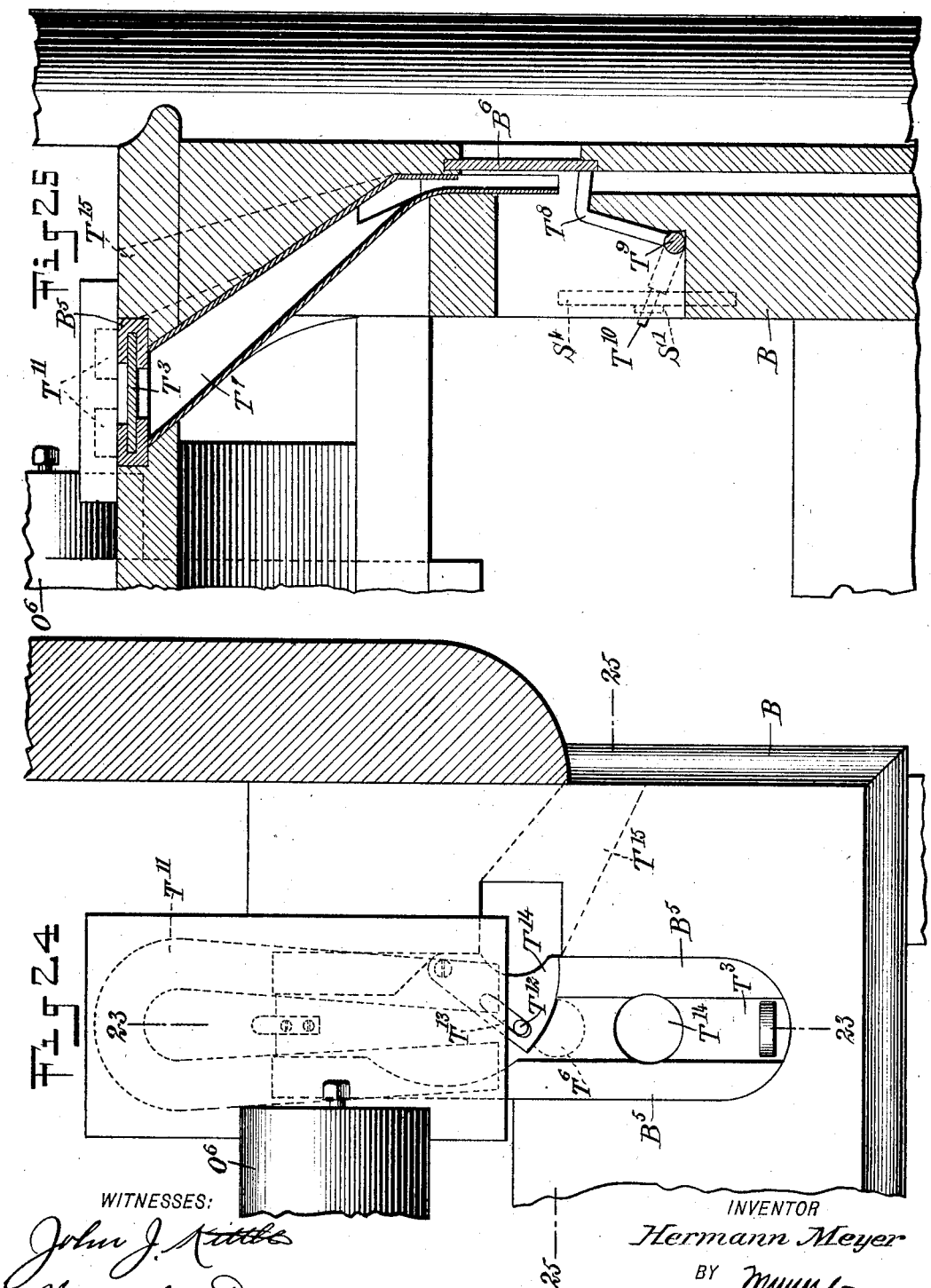

No. 846,419. PATENTED MAR. 5, 1907.
H. MEYER.
REWINDING MECHANISM FOR SELF PLAYING PIANOS.
APPLICATION FILED DEC. 23, 1905.

17 SHEETS—SHEET 17.

WITNESSES:
John J. Kittler
Geo. G. Hooster

INVENTOR
Hermann Meyer
BY
Munn
ATTORNEYS

UNITED STATES PATENT OFFICE.

HERMANN MEYER, OF NEW YORK, N. Y.

REWINDING MECHANISM FOR SELF-PLAYING PIANOS.

No. 846,419.

Specification of Letters Patent.

Patented March 5, 1907.

Original application filed August 3, 1905, Serial No. 272,499. Divided and this application filed December 23, 1905. Serial No. 293,079.

*To all whom it may concern:*

Be it known that I, HERMANN MEYER, a citizen of the United States, and a resident of the city of New York, borough of the Bronx, in the county and State of New York, have invented a new and Improved Rewinding Mechanism for Self-Playing Pianos, of which the following is a full, clear, and exact description, this being a division of the application for Letters Patent of the United States for a self-playing piano, Serial No. 272,499, filed by me August 3, 1905.

The object of the invention is to provide a new and improved rewinding mechanism for a self-playing piano arranged to allow the use of a single note-sheet containing a number of pieces of music, only one of which is played upon the introduction of a coin, the note-sheet being automatically rewound at the end of the last piece of music to start playing the first piece of music upon the introduction of another coin.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in all the views.

Figure 5:
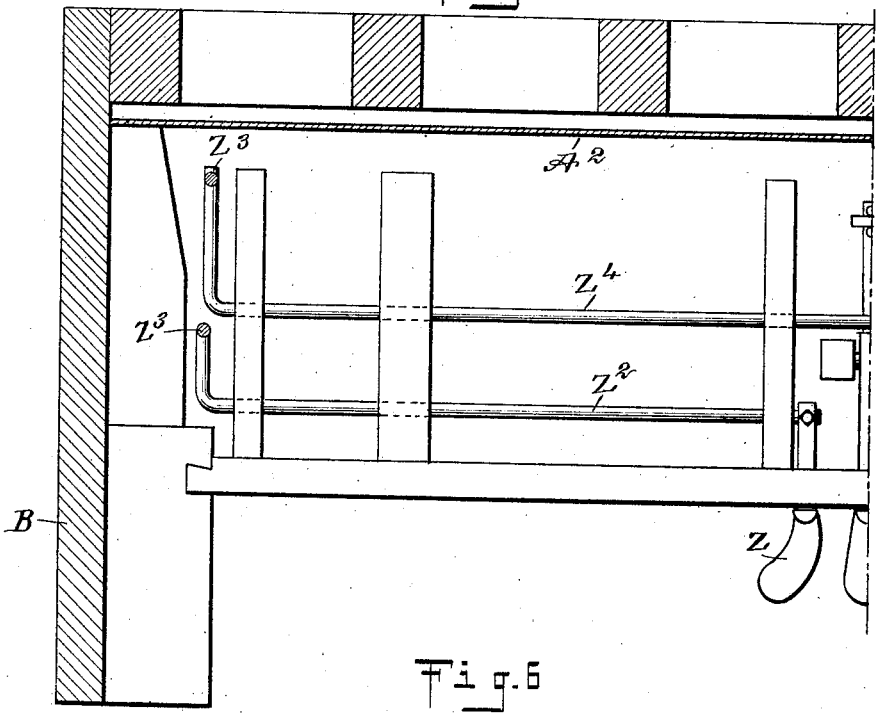
Figure 6:
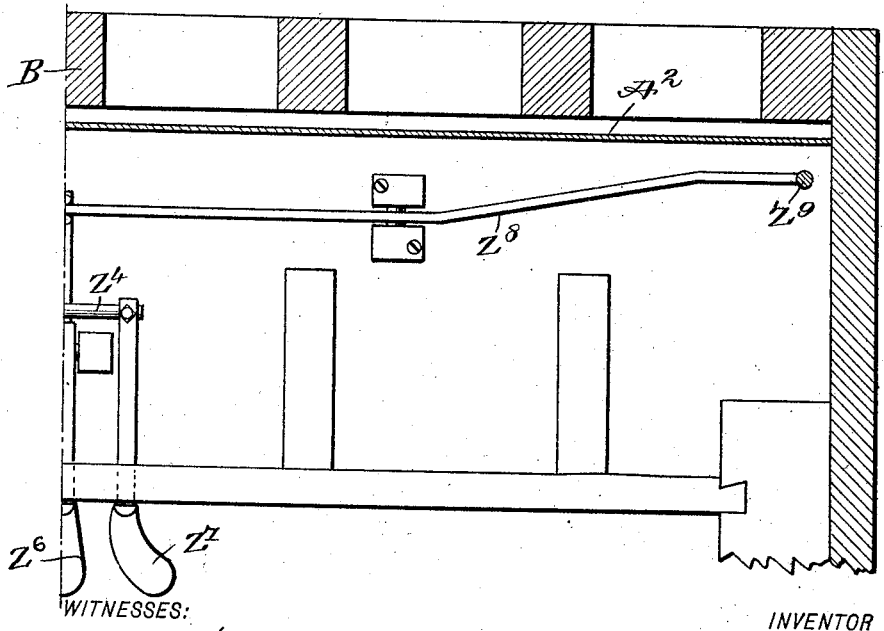
Figure 13:
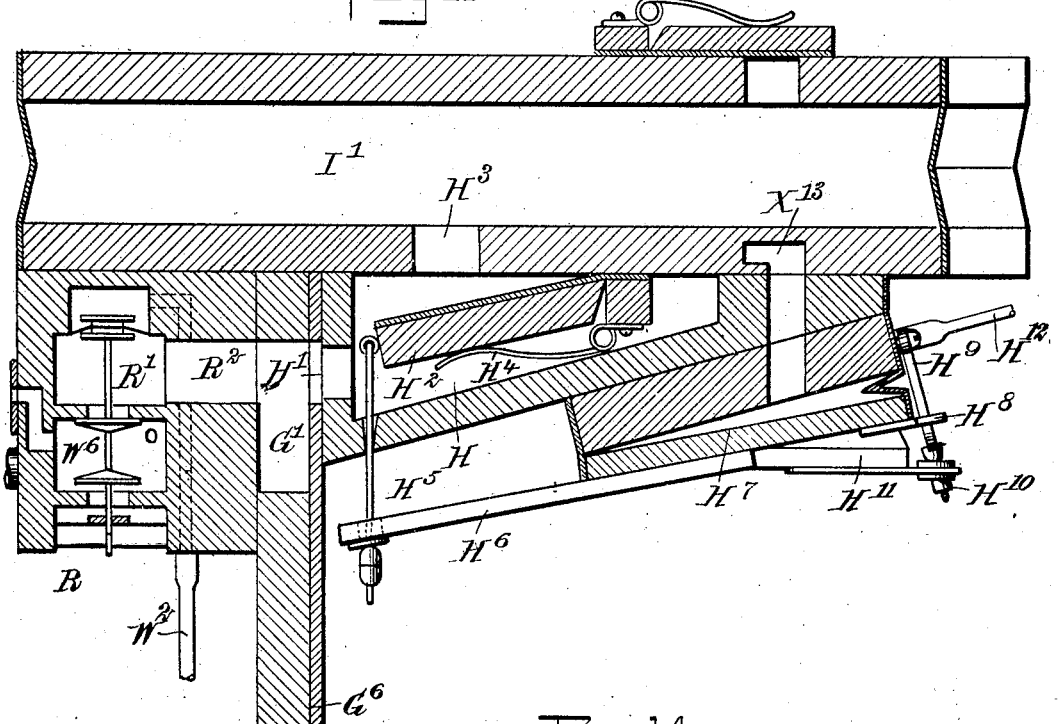
Figure 14:
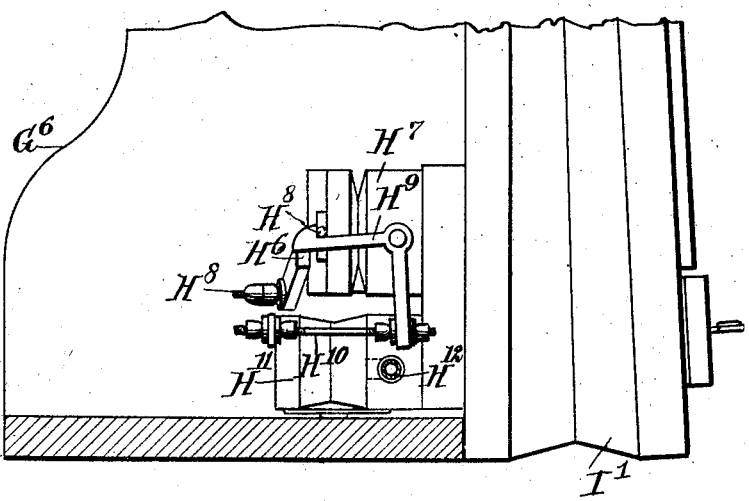
Figure 20:
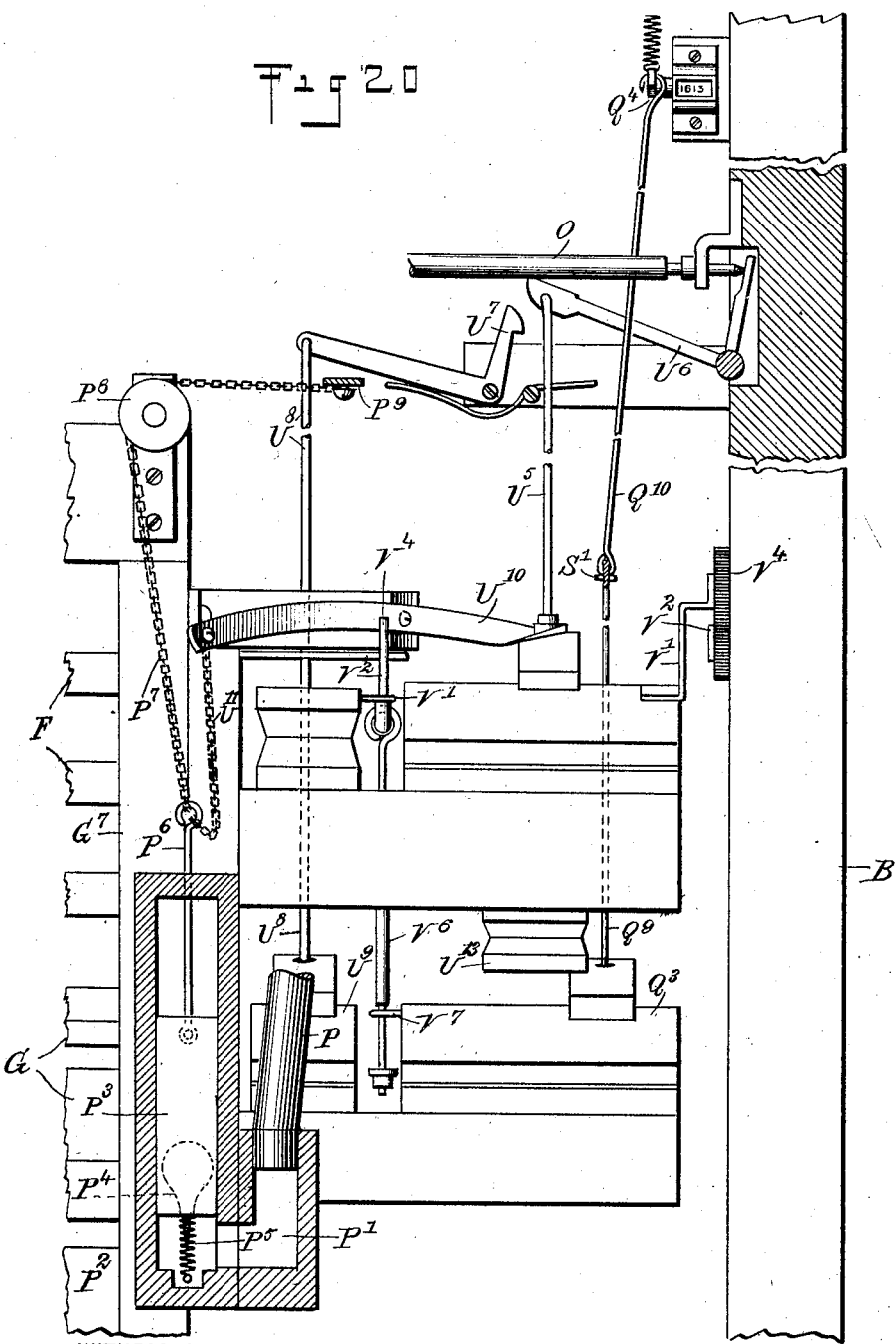
Figure 26:
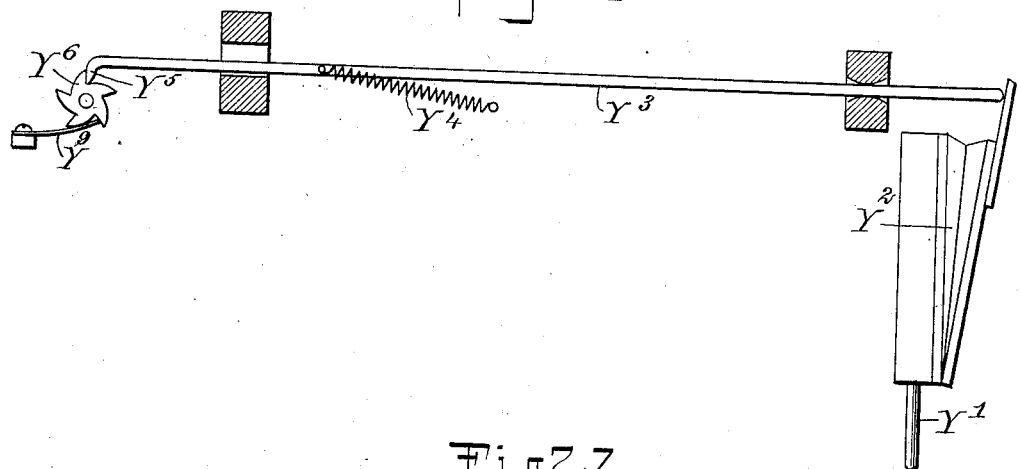
Figure 27:
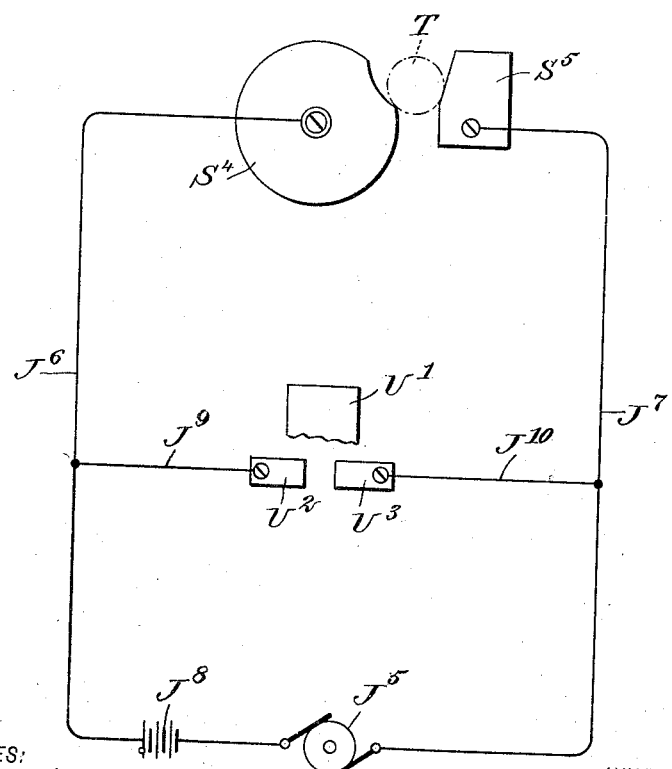

Figures 1 and 1ª are elevations of the front of the instrument. Fig. 2 is a transverse section of the same on the line 2 2 of Fig. 1.
Fig. 3 is a like view of the same on the line 3 3 of Fig. 1. Fig. 4 is a similar view of the same on the line 4 4 of Fig. 1ª. Fig. 5 is a sectional plan view of the improvement on the line 5 5 of Fig. 1. Fig. 6 is a similar view of the same on the line 6 6 of Fig. 1ª. Fig. 7 is an enlarged transverse section of the improvement on the line 7 7 of Fig. 1 and showing more particularly the pneumatic-valve mechanism for controlling the hammer-rail, the damper-rail, the stopping mechanism, and the indicating mechanism. Fig. 8 is an enlarged cross-section of the same on the line 8 8 of Fig. 1. Fig. 9 is an enlarged cross-section of the improvement on the line 9 9 of Fig. 1. Fig. 10 is a similar view of the same on the line 10 10 of Fig. 1. Fig. 11 is an enlarged transverse section of the improvement on the line 11 11 of Fig. 1. Fig. 12 is a face view of the right-hand-side connecting-board. Fig. 13 is an enlarged sectional plan view of the improvement on the line 13 13 of Fig. 1 and showing more particularly the main-valve connection between the pneumatics and the suction-chamber of the suction-bellows. Fig. 14 is an enlarged cross-section of the same on the line 14 14 of Fig. 1. Fig. 15 is a face view of the main board for the action-pneumatics. Fig. 16 is a sectional plan view of the pneumatics for actuating the damper-rail, the stopping mechanism, and the note-sheet-rewinding mechanism, the section being on the line 16 16 of Fig. 18. Fig. 17 is a sectional plan view of the same on the line 17 17 of Fig. 18.
Fig. 18 is a transverse section of the same on the line 18 18 of Figs. 16 and 17. Fig. 19 is a sectional front elevation of the same on the line 19 19 of Fig. 16. Fig. 20 is an enlarged sectional front elevation of the speed-regulating valve and part of the rewinding mechanism. Fig. 21 is an enlarged front elevation of the mechanism for winding up and rewinding the note-sheet. Fig. 22 is an enlarged front elevation of the tracker-board and note-sheet. Fig. 23 is a cross-section of the coin-controlled mechanism, the section being on the line 23 23 of Fig. 24. Fig. 24 is a plan view of the same. Fig. 25 is a sectional front elevation of the same on the line 25 25 of Fig. 24. Fig. 26 is an enlarged rear elevation of the indicator mechanism; and Fig. 27 is a diagrammatic view of the motor and the two motor-circuits.

The strings A of the self-playing instrument are stretched on a string-frame A', extending in the front of a sounding-board A² and held with the latter in the usual manner on the piano-frame B. (See Fig. 2.) The piano-action for sounding the strings A may be of any approved construction. It preferably, however, consists of hammers C, normally resting on a hammer-rail C' and adapted to be actuated by keys D, which latter are either played by hand or by the mechanical means presently to be described in detail. The under sides of the keys D, at the rear ends thereof, are adapted to be engaged by pins E, mounted to slide vertically in suitable bearings formed on the keyboard-bottom B', and the lower ends of the said pins rest on the rear ends of levers E', fulcrumed on the under side of the said bottom B'. Each lever E' is pressed upward at its forward end by a spring E², and the said forward end is connected by a rod E³ with the movable member of an action-pneumatic F, the several action-pneumatics F being preferably arranged in tiers to economize in space. The pneumatics F are connected with pneumatic-valve chests G, likewise arranged in tiers and located below the tiers of the pneumatics F, and the said valve-chests G are connected with a suction-chamber G', (see Figs. 10 and 13,) connected by a port H' with a valve-chamber H, provided with a valve H², controlling a port H³, opening into the suction-chamber I' of suction-bellows I, having their movable members connected by pitmen J' with a crank-shaft J, extending lengthwise and journaled in suitable bearings in the lower portion of the frame B. (See Figs. 1ª and 4.)

The crank-shaft J is provided with a worm-wheel J², in mesh with a worm J³, secured on the shaft J⁴ of a motor J⁵, preferably of the electric type. When the motor J⁵ is running, the suction-bellows J are actuated to exhaust air from the suction-chamber I', which in turn exhausts air from the valve-chamber H and the suction-chamber G' as long as the valve H² is open; but if the valve H² is closed and the motor J⁵ is running for rewinding purposes, as hereinafter more fully described, then the valve-chamber H and suction-chamber G', and consequently the pneumatic-valve chests G and pneumatics F, are not affected.

The valve-chests G are provided with pneumatic-valve mechanisms, preferably of the construction shown and described in Letters Patent of the United States No. 756,674, granted to me April 5, 1904, so that further detailed description of the said valve mechanism is not deemed necessary, it being deemed sufficient to state that each valve-chest G is provided with an exhaust-chamber G² and an inlet-chamber G³, connected by a flexible tube G⁴ with a tracker-board opening K' in the tracker-board K, over which passes the note-sheet L, having note-apertures L' and unwinding from a roller N and winding up on a roller N' when the instrument is playing. The tracker-board K is fixed on an auxiliary frame B², forming part of the main frame B, and the rollers N and N' are journaled in suitable bearings arranged on the said frame B². When the instrument is in action and a note-aperture L' registers with a tracker-board opening K', then the corresponding valve mechanism in a valve-chest G is actuated to connect the corresponding pneumatic F with the exhaust-chamber G² to cause the pneumatic F to collapse. When this takes place, the movable member of the collapsing pneumatic F pulls the rod E³ downward to impart a swinging motion to the lever E' against the tension of the spring E² thereof, and this downward-swinging motion of the front end of the lever E' causes the rear end thereof to move upward to lift the pin E, and thereby impart a swinging motion to the corresponding key D, which in turn causes its hammer C to sound the corresponding string A. As soon as the note-aperture L' has passed out of register with its tracker-board opening K' then the air previously allowed to pass into the inlet-chamber G³ by may of the tube G⁴ is now permitted to escape or leak out to allow the valve mechanism to return to its previous position, so that atmospheric air passes into the pneumatic G to again inflate the same. When this takes place, the rod E³ of this pneumatic moves upward to allow the lever E', the pin E, and the key D and hammer C to assume their normal position, the hammer C moving back to a position of rest against the rail C⁷.

As shown in Figs. 1, 12, and 2, the pneumatics F and the valve-chests G are secured to the front of a longitudinally-extending board G⁵, (see Fig. 15,) carrying at its rear the suction-bellows I and suction-chamber I². The sides of the tiers of pneumatics F and valve-chests G are attached to transversely-extending connecting-boards G⁶ and G⁷, (shown in detail in Figs. 10 and 12, respectively,) and the said connecting-boards are supported on the main frame B.

In order to cause the note-sheet L to travel downward over the tracker-board K in the direction of the arrow a' for playing purposes, the following device is provided, special reference being had to Figs. 1ª and 21: On the shaft N² of the winding-up roller N' is secured a gear-wheel N³, in mesh with a pinion N⁴, provided with a clutch member N⁵, adapted to be engaged by a clutch member N⁶, secured at one end of a shaft O, mounted to turn and to slide in the direction of its length in suitable bearings arranged on the main frame B. The shaft O is provided with a sprocket-wheel O', over which passes a sprocket-chain O², also passing over a sprocket-wheel O³, secured on the crank-shaft O⁴ of a pneumatic motor O⁵, used for imparting a rotary motion to the shaft O⁴, which by the sprocket-wheels O³ O' and sprocket-chain O² imparts a rotary motion to the shaft O. When the several parts are in the position as shown in Figs. 1ª and 21 and shaft O is rotated, then the clutch member N⁶ engages the clutch member N⁵ to rotate the pinion N⁴, mounted loosely on the shaft O, and the rotation of the pinion N⁴ is transmitted to the gear-wheel N³ and shaft N² to turn the winding-up roller N' with a view to wind up the note-sheet L—that is, to cause the same to travel downward in the direction of the arrow a'. In order to rewind the note-sheet L at the end of the last piece of music on the note-sheet, the shaft O is shifted from the right to the left, so that the clutch member N⁶ moves out of engagement with the clutch member N⁵ and moves into engagement with a clutch gear-wheel N⁷, in mesh with a pinion $N^8$, meshing with a gear-wheel $N^9$, secured on the shaft $N^{10}$ of the unwinding-roller N. When the clutch member $N^6$ is in mesh with the clutch gear-wheel $N^7$ and the shaft O is rotated, then the clutch gear-wheel $N^7$ is rotated by the clutch member $N^6$ and rotates the pinion $N^8$, which in turn rotates the gear-wheel $N^9$, shaft $N^{10}$, and unwinding-roller N for the latter to wind up the note-sheet L—that is, to cause the same to travel upward in the inverse direction of the arrow $a'$. It is understood that during this operation the roller N' is free to rotate, as the clutch member $N^6$ is out of engagement with the clutch member $N^5$, and consequently the pinion $N^4$ can rotate freely on the shaft O.

The pneumatic motor $O^5$ may be of any approved construction—such, for instance, as shown and described in the Letters Patent of the United States, No. 765,503, granted to me July 19, 1904. The suction-chamber $O^6$ of the motor $O^5$ is connected by a flexible tube P with a chamber P', (see Figs. 1ª and 20,) and this chamber P' is in communication with a valve-chest $P^2$, containing a slide-valve $P^3$, which is the controlling or tempo valve for the motor $O^5$ and controls a graduated opening $P^4$, directly connected with the suction-chamber I' of the suction-bellows I, so that when the valve $P^3$ is open air is exhausted by way of the graduated opening $P^4$, chest $P^2$, chamber P', and tube P from the controlling-valve $O^6$ to cause the pneumatic motor $O^5$ to start running, with a view to rotate the shaft O for either driving the winding-up roller N' or the unwinding-roller N for rewinding the note-sheet L, as hereinafter more fully explained. A pull-spring $P^5$ is connected with the slide-valve $P^3$ to move the latter into a more or less closed position relative to the graduated opening $P^4$, and the said slide-valve $P^3$ is connected at its valve-stem $P^6$ with one end of a chain $P^7$, passing over a guide-pulley $P^8$ and connected with a speed-regulating lever $P^9$, fulcrumed on the main frame B and under the control of an operator to enable the latter to shift the slide-valve $P^3$ into a more or less open position, according to the speed desired for moving the note-sheet L over the tracker-board and according to the time in which the piece of music is written.

In order to control the motor $J^5$ for starting the instrument, a coin-controlled mechanism is provided arranged in such a manner that the introduced coin closes the motor-circuit, thus starting the motor $J^5$ for actuating the suction-bellows I. As the valve $P^3$ is always open (more or less) and the graduated opening $P^4$ is directly connected with the suction-chamber I' of the suction-bellows I, it is evident that air is exhausted from the controlling-valve $O^6$ to start the pneumatic motor $O^5$ and to keep the same running as long as the circuit is closed by the introduced coin. When the pneumatic motor $O^5$ is running, after a coin is introduced the note-sheet L is caused to wind up on the driven roller N' and to unwind from the roller N. The note-sheet L is preferably provided with a number of pieces of music, only one of which is played on the introduction of a coin, and in order to stop the motor $J^5$ automatically, and hence the pneumatic motor $O^5$, at the end of each piece of music the note-sheet L is provided between adjacent pieces of music with a stop-aperture $L^4$, adapted to register with a tracker-board opening $K^2$, connected by a tube Q with the air-chamber Q' of a pneumatic valve $Q^2$, (see Fig. 8,) controlling a stopping-pneumatic $Q^3$, which in turn controls the coin retaining and releasing device, and also the counter $Q^4$ for counting the coins introduced into the machine. The valve $Q^2$ is similar to the one described in the Letters Patent of the United States No. 773,406, for a self-playing piano, granted to me October 25, 1904, so that further detailed description of the same is not deemed necessary, it being sufficient to state that the stopping-pneumatic $Q^3$ is connected by a channel $Q^5$ with an exhaust-chamber $Q^6$, in communication by a port $Q^7$ with a main chamber R' of a wind-chest R, attached to the connecting-board $G^6$. (See Figs. 1 and 13.) The main chamber R' connects by ports $R^2$ (see Figs. 8 and 13) with the suction-chamber G' in communication with the suction-chamber I', as previously stated, so as to exhaust air from the main chamber R' when the machine is in operation and the valve $H^2$ is open. The valve $Q^2$ normally closes the exhaust-chamber $Q^6$ to the main chamber R', as plainly shown in Fig. 8, while the chamber $Q^6$ is connected by a port $Q^8$ with the atmosphere. When a stopping-aperture $L^2$ in the note-sheet L registers with a tracker-board opening $K^2$, then air passes by way of the tube Q into the air-chamber Q' to actuate the valve $Q^2$ to close the chamber $Q^6$ to the atmosphere and to connect the said chamber $Q^6$ by the port $Q^7$ with the main chamber R', so that air is exhausted from the pneumatic $Q^3$ by way of the channel $Q^5$ to collapse the said pneumatic.

The movable member of the stopping-pneumatic $Q^3$ is connected by a rod $Q^9$ with the lever S' of the coin-controlled mechanism S. (See Figs. 23, 24, and 25.) The lever S' is fulcrumed at $S^2$ on an insulated plate $B^4$, forming part of the main frame B, and the said lever S' engages with its slotted end a pin $S^3$ on the member $S^4$, operating in conjunction with a fixed member $S^5$ for holding a coin T between the said members, as indicated in Fig. 23, to keep the motor-circuit closed for the time being. The member $S^4$ is in the form of a disk mounted to turn on the plate $B^4$, and the peripheral surface of the said member $S^4$ is provided with a cut-out portion or notch $S^6$, so that when the stopping-pneumatic $Q^3$ is collapsing and its rod $Q^9$ pulls on the lever $S'$ then the latter imparts a turning motion to the member $S^4$ to turn the same in the direction of the arrow $b'$, so that the cut-out portion $S^6$ comes in contact with the peripheral edge of the coin T, and thus allows the latter to move downward with the member $S^4$ and finally drop out from between the members $S^4$ and $S^5$, thus to break the first or coin-controlled motor-circuit. (See Fig. 27.)

The lever $S'$ is held in its normal position shown in Fig. 23 by a spring $S^7$, to return the member $S^4$ to the position shown in Fig. 23 as soon as the stop-aperture $L^2$ has passed a tracker-board opening $K^2$. The lever $S'$ is connected by a link $Q^{10}$ with the counter $Q^4$, previously mentioned, so that whenever the lever $S'$ is actuated by the stopping pneumatic $Q^3$, as above described, and the coin T is dropped from between the members $S^4 S^5$ then the counter $Q^4$ is actuated to register the coin thus dropped. The coin is passed between the members $S^4$ and $S^5$ by way of a coin-chute $T'$, into the upper end of which opens an opening $T^2$, normally closed by a coin-slide $T^3$, mounted to slide in suitable bearings $B^5$, forming part of the main frame B. The coin-slide $T^3$ is provided with an opening $T^4$ for the reception of the proper coin, and the said slide is pressed on at its inner end by a spring $T^5$ to hold the slide normally in the position shown in Fig. 23—that is, with the coin-opening $T^4$ out of register with the drop-opening $T^2$. In front of the drop-opening $T^2$ is formed an opening $T^6$, somewhat smaller than the opening $T^2$, to drop spurious coin into a chute $T^7$ instead of carrying the spurious coin to the opening $T^2$ and the coin-chute $T'$. Thus when a spurious coin is placed in the opening $T^4$ and the slide $T^3$ is pushed rearward by the operator in the direction of the arrow $c'$ and against the tension of the spring $T^5$ then the spurious coin drops through the opening $T^6$ into the chute $T^7$, and hence does not pass between the members $S^4$ and $S^5$. The spurious coin passing down the chute $T^7$ is retained in the chute for the time being by a retaining-arm $T^8$, formed on one end of a shaft $T^9$, mounted to turn in suitable bearings arranged on the frame B. The inner end of the shaft $T^9$ is provided with an angular offset $T^{10}$, engaging an aperture in the lever $S'$, so that when the latter is actuated from the stopping pneumatic $Q^3$, as previously explained, then the shaft $T^9$ is turned and the retaining-arm $T^8$ releases the spurious coin, which then drops with the proper coin introduced subsequently to the spurious coin, but into a separate receptacle arranged within the machine. The spurious coin may be viewed while at rest on the retaining-arm $J^8$ through a glass pane $B^6$, arranged in the slide of the casing B. (See Fig. 25.)

In case a piece of iron of the size of the proper coin T is placed into the slide-opening $T^4$ and the slide is pushed rearward then the piece of iron does not drop through the opening $T^2$ into the coin-chute $T'$, but is attracted by a magnet $T^{11}$, secured to the frame B and arranged directly over this rear portion of the slide $T^3$. In order to move this piece of iron out of engagement with the under side of the magnet $T^{11}$, the following arrangement is made: On the slide $T^3$ is secured an upwardly-projecting pin $T^{12}$ in engagement with an elongated slot $T^{13}$, formed in a lever $T^{14}$, fulcrumed on the guideway $B^5$ and extending between the top of the slide $T^3$ and the under side of the magnet $T^{11}$. When the slide $T^3$ is pushed rearward, the lever $T^4$ is swung in a like direction, and when the piece of iron is attracted by the magnet $T^{11}$ and lifted out of the opening $T^4$ and the slide is allowed to return then the lever $T^{14}$ engages the rear side of the piece of iron and pushes the same to the right into a chute $T^{15}$, leading to the chute $T^7$, a distance above the arm $T^8$. Thus from the foregoing it will be seen that only when the proper coin T is placed into the opening $T^4$ and the slide $T^3$ is pushed rearwardly then this proper coin drops down the coin-chute $T'$ between the members $S^4$ and $S^5$ to close the motor-circuit to start the machine. When the piece of music has been played and the stopping-aperture $L^2$ moves in engagement with the tracker-board opening $K^2$, then the coin T is released and the motor-circuit is broken to stop the motor.

The circuit-wires $J^6$ and $J^7$ (see Fig. 26) connect the motor $J^5$ with the members $S^4$ and $S^5$, and the wire $J^6$ contains a battery $J^8$ or other suitable source of electric energy. When the coin T is in position between the members $S^4 S^5$, the circuit is closed, and when the coin T drops out of position between the members $S^4 S^5$, the circuit is broken, and hence the motor $J^5$ stops.

After the last piece of music of the note-sheet L is played then the note-sheet is automatically rewound, and for this purpose it is necessary to release the coin T by the action of the stopping pneumatic $Q^3$ to break the motor-circuit, as described, and to again immediately close the motor-circuit to keep the motor running during the rewinding operation, at the same time closing the valve $H^2$ for preventing the instrument from playing. For the purpose mentioned use is made of a pneumatic U, controlled by the simultaneous action of the stopping pneumatic $Q^3$, and a pneumatic V, singly actuated whenever the mechanism is actuated which is employed for releasing the rail $C'$ from its rearward or half-stroke position, the same as if the soft-pedal of an ordinary piano were released.

The pneumatic U (see Figs. 16, 18, 19, 20, and 26) is provided on top with a contact-closing plate U', adapted to make contact with contact-plates $U^2$ and $U^3$ whenever the pneumatic U is collapsed, the said contact-plates $U^2$ and $U^3$ being secured on an insulated plate $U^4$, attached to the main frame B, and the said contact-plates $U^2$ and $U^3$ are connected by branch wires $J^9$ and $J^{10}$ with the circuit-wires $J^6$ and $J^7$, thus forming a second pneumatically-controlled motor-circuit. (See Fig. 27.)

The movable member of the pneumatic U (see Fig. 20) is connected by a rod $U^5$ with one arm of a bell-crank lever $U^6$, fulcrumed on the main frame B and engaging with its other arm the right-hand end of the shaft O, pressed in the direction from the left to the right by the spring $O^7$, as plainly shown in Figs. $1^a$ and 21. When the pneumatic U collapses, then the rod $U^5$ imparts a swinging motion to the bell-crank lever $U^6$, so that the latter shifts the shaft O from the right to the left to move the clutch member $N^6$ out of engagement with the clutch member $N^5$ and to move the clutch member $N^6$ into engagement with the clutch gear-wheel $N^7$. As the motor $J^5$ is kept running, owing to the closing of the second circuit, as above described, the shaft O is rotated, and consequently the roller N is driven to rewind the note-sheet L.

When the bell-crank lever $U^6$ is actuated as above described, then a spring-pressed catch $U^7$ (see Fig. 20) engages and locks the lever $U^6$ to hold the shaft O in the reversing position until the note-sheet L is completely rewound, and when this has taken place then the catch $U^7$ is tripped to release the bell-crank lever $U^6$ to allow the spring $O^7$ to return the shaft O to its right-hand end position—that is, to move the clutch member $N^6$ out of engagement with the clutch gear-wheel $N^7$ and to move the clutch member $N^6$ back into engagement with the clutch member $N^5$. The spring-catch $U^7$ is connected for the purpose by a rod $U^8$ with a pneumatic $U^9$, located alongside the pneumatic Q and operating in conjunction with the pneumatic U. The movable member of the pneumatic U is also connected with one end of a lever $U^{10}$, (see Fig. 20,) connected by a chain $U^{11}$ with the stem $P^6$ of the slide-valve $P^3$, so that when the pneumatic U collapses the lever $U^{10}$ is caused to swing and the chain $U^{11}$ then pulls the slide-valve $P^3$ into a wide-open position to insure a fast working of the pneumatic motor $O^5$ with a view to quickly rewind the note-sheet L.

The note-sheet L besides having the stopping-apertures $L^2$ is provided at the end of the note-sheet with an aperture $L^3$, arranged in transverse alinement with the last stopping-aperture $L^2$. The aperture $L^3$ is in alinement with a row of apertures $L^4$, controlling the mechanism for releasing the rail C' from the half-stroke position, it being understood that another row of apertures $L^5$ controls the means for moving the rail C' into the half-stroke position. In a like manner the note-sheet L is provided with two rows of apertures $L^6$ and $L^7$, which control the mechanism for throwing the damper $C^2$ off or on, and as the two sets of apertures $L^4$ $L^5$ and $L^6$ $L^7$ and the mechanisms they control are the same as the ones shown and described in the Letters Patent of the United States No. 773,406, above mentioned, it is not deemed necessary to further describe the same in detail, it being sufficient to state that the apertures $L^3$ and $L^4$ in the note-sheet L are adapted to register with a tracker-board opening $K^3$, the row of apertures $L^5$ is adapted to register with the tracker-board opening $K^4$, the row of apertures $L^6$ is adapted to register with the tracker-board opening $K^5$, and the row of apertures $L^7$ is adapted to register with the tracker-board opening $K^6$. The tracker-board openings $K^3$, $K^4$, $K^5$, and $K^6$ are connected by flexible tubes W, W', $W^2$, and $W^3$ with the corresponding air-chambers of pneumatic-valve mechanisms $W^4$, $W^5$, $W^6$, and $W^7$, (see Fig. 8,) all connected with the suction-chamber R', previously referred to.

It is understood that the valve mechanism $W^5$ controls the rail C' with a view to move the same into a half-stroke position, and the valve mechanism $W^4$ serves to release the rail and allow it to return to a normal position of rest. For this purpose the valve mechanism $W^5$ is connected by a pipe $W^3$ (see Figs. 1, 3, 5, and 7) with the pneumatic $W^9$, which when collapsing actuates a lever $C^4$, engaging one end of the rail C'. (See Fig. 3.) When the valve mechanism $W^4$ is actuated, the pneumatic $W^9$ is allowed to inflate to permit the rail C' to return to a position of rest. In a like manner, the valve mechanism $W^6$ is connected by a tube $W^{10}$ with the pneumatic $W^{11}$, controlling the lever $C^5$ for the damper-rail $C^3$, actuating the dampers $C^2$, so that when the pneumatic $W^{11}$ collapses the dampers $C^2$ are thrown off the strings, and when the valve mechanism $W^7$ is actuated the pneumatic $W^{11}$ is allowed to inflate to return the dampers $C^2$ to their normal position—that is, against the strings to damp the same.

The pneumatic-valve mechanism $W^4$ has its exhaust-chamber connected by a channel $V^9$ with the pneumatic V, so that when the valve mechanism $W^4$ is actuated on any one of the note-sheet apertures $L^4$ registering with the tracker-board openings $K^3$, then the rail C' is returned to a normal position of rest, and at the same time the pneumatic V is caused to deflate or collapse; but as the pneumatic $Q^3$ does not collapse at this time it is evident that the pneumatic U is not affected, as it requires both the pneumatics V and $Q^3$ to collapse simultaneously in order to collapse the pneumatic U. When the note-sheet apertures $L^2$ and $L^3$, however, register simultaneously with the tracker-board openings $K^2$ and $K^3$, then both pneumatics V and $Q^3$ are simultaneously deflated.

The connection between the pneumatics U and V $Q^3$ is as follows, special reference being had to Figs. 16, 17, 18, and 19: The movable member of the pneumatic V is provided with an eye V', engaging the angular end $V^2$ of a lever $V^3$, fulcrumed on a rod $V^4$, resting on the top of a hinged valve $V^5$, controlling the exhaust-channel $U^{12}$, leading from the pneumatic U directly into the suction-chamber I' of the suction-bellows I, (see Figs. 11 and 12,) and the said lever $V^3$ is provided with a link $V^6$, having a limited sliding connection with an eye $V^7$, secured on the movable member of the pneumatic $Q^3$. A spring $V^8$ (see Figs. 18 and 19) presses the valve $V^5$ to normally hold the same in a closed position. When the pneumatic $Q^3$ collapses while the pneumatic V is inflated, it is evident that the eye $V^7$ slides freely on the link $V^6$, and when the pneumatic V collapses while the pneumatic $Q^3$ is inflated then the eye V' simply rocks the lever $V^3$, as the end of the link $V^6$ now slides freely in the eye $V^7$. When, however, both pneumatics V and $Q^3$ are simultaneously collapsed on the apertures $L^2$ and $L^3$ registering simultaneously with the tracker-board openings $K^2$ and $K^3$, (see Fig. 22,) then a downward pull is exerted on both ends of the lever $V^3$ to move the latter bodily downward and with it the rod $V^4$, to swing the valve $V^5$ into an open position, and thereby allow the air to be sucked out of the pneumatic U for the latter to collapse.

By reference to Fig. 18 it will be seen that the eye V' normally rests on a shoulder of the angular arm $V^2$ and the collar on the lower end of the link $V^6$ is a distance below the eye $V^7$, and when the two pneumatics V and $Q^3$ collapse simultaneously then the eye V' of the movable member of the pneumatic V first causes a slight swinging motion to the lever $V^3$ until the collar on the lower end of the lifted link $V^6$ meets and is engaged by the downward-moving eye $V^7$ on the movable member of the pneumatic $Q^3$, and when this takes place the further collapsing of the pneumatics V and $Q^3$ causes the bodily-downward movement of the lever $V^3$ above mentioned.

In order to close the valve $H^2$ at the time the pneumatic U collapses and the rewinding of the note-sheet L begins, the following device is provided, special reference being had to Figs. 1, 1ª, 13, 14, and 18: The valve $H^2$ is a hinged valve and is pressed on by a spring $H^4$, and the said valve is connected by a rod $H^5$ with an arm $H^6$, attached to the movable member of a normally collapsed pneumatic $H^7$, provided at its movable member with a pin $H^8$, normally engaged by a catch $H^9$ in the form of a bell-crank lever fulcrumed on the fixed part of the pneumatic $H^7$. By this arrangement the pneumatic $H^7$ is normally locked in a collapsed position. The bell-crank lever $H^9$ (see Fig. 14) is connected by a rod $H^{10}$ with the movable member of a pneumatic $H^{11}$, connected by a flexible tube $H^{12}$ with a channel $H^{13}$ (see Fig. 18) opening into the pneumatic U, so that when the latter is connected by the channel $U^{12}$ with the suction-chamber L' then suction is had through the channel $H^{13}$ and tube $H^{12}$ in the pneumatic $H^{11}$ to collapse the same. In collapsing the pneumatic $H^{11}$ the rod $H^{10}$ swings the catch $H^9$ out of engagement with the pin $H^8$, so as to release the normally collapsed pneumatic $H^7$ to allow the spring $H^4$ of the valve $H^2$ to close the port $H^3$, thus disconnecting the valve-chest H from the suction-chamber I', and hence the air is not exhausted from the valve-chamber H and the suction-chamber G' for the pneumatics F. Thus the latter remain dormant during the rewinding of the note-sheet.

In order to throw the rewinding-gear out of action after the note-sheet is rewound on the roller N and to reopen the valve $H^2$ and to bring all the parts back to a normal position, the following arrangement is made: On the beginning end of the note-sheet L is arranged an aperture $L^8$, adapted to register with the tracker-board opening $H^7$ (see Fig. 22) at the time the note-sheet is rewound. The tracker-board opening $K^7$ is connected by a flexible tube X with an air-chamber X', (see Fig. 8,) forming part of a pneumatic-valve mechanism similar to the valve mechanism $Q^2$—that is, the diaphragm $X^2$ separates the air-chamber X' from the suction-chamber $X^3$, connected by a channel $X^4$ directly with the interior of the suction-chamber I' of the suction-bellows I. A port $X^5$ leads from the suction-chamber $X^3$ into a chamber $X^6$, and this port $X^5$ is normally closed by a valve $X^7$, held on a valve-stem $X^8$, attached to the diaphragm $X^2$ and carrying a valve $X^9$, controlling a port $X^{10}$, leading to the atmosphere. From the chamber $X^6$ leads a channel $X^{11}$ into the pneumatic $U^9$, (see Fig. 17,) and the channel $X^{11}$ is provided with a branch channel $X^{12}$, (see Fig. 18,) opening into a pneumatic $U^{13}$, carrying a valve $U^{14}$, normally closing an air-inlet port $U^{15}$, opening into the pneumatic U. From the channel $X^{11}$ leads another branch port $X^{13}$ (see Figs. 13 and 15) to the pneumatic $H^7$. When the aperture $L^8$ registers with the opening $K^7$, then air is admitted to the chamber X' to cause the diaphragm $X^2$ to move, and thereby open the valve $X^7$ and close the valve $X^9$. When this takes place, air is drawn out of the chamber $X^6$ by way of the port $X^5$, chamber $X^3$, and channel $X^4$, connected with the suction-chamber I', and hence air is drawn by way of the channel $X^{11}$ from the pneumatics $U^9$, $U^{13}$, and $H^7$ to collapse the same and approximately at the same time. The collapsing of the pneumatic $U^9$ causes the catch $U^7$ to release the bell-crank lever $U^6$, (see Fig. 20,) and the collapsing of the pneumatic (see Fig. 18) causes the valve $U^{14}$ to open, so that atmospheric air can pass by way of the port $U^{15}$ into the pneumatic U to inflate the same and thereby allow the spring $O^7$ to quickly slide the shaft O from the left to the right to move the clutch member $N^6$ out of engagement with the clutch member $N^7$. The inflation of the pneumatic U causes the contact-plate $U'$ to move out of engagement with the contact-plates $U^2$ and $U^3$ to break the second motor-circuit with a view to stop the motor. Drawing the air out of the pneumatic $H^7$ by way of the channel $H^{13}$ causes the said pneumatic to collapse, and in doing so it swings the valve $H^2$ back into an open position against the tension of the spring $H^4$. (See Fig. 13.) When the pneumatic $H^7$ collapses, the catch $H^9$ again engages the pin $H^8$ to lock the pneumatic $H^7$ in the collapsed position.

In order to indicate which of the pieces of music is playing at the time, an indicator Y is provided, (see Figs. 1, 2, and 26,) controlled from the stopping-valve mechanism $Q^2$. (See Fig. 8.) For this purpose the exhaust-chamber $Q^6$ is connected by a tube $Y'$ with a pneumatic $Y^2$, the movable member of which controls a sliding rod $Y^3$, pressed on by a spring $Y^4$ and having a pawl $Y^5$ engaging a ratchet-wheel $Y^6$ on the shaft of a pointer $Y^7$, indicating on a dial $Y^8$, arranged on the front of the machine, as plainly shown in Fig. 1$^a$. Thus when the stopping-valve mechanism $Q^2$ is actuated—at the time the end of a piece of music is reached, as before explained—then the air is drawn out of the pneumatic $Y^2$ to collapse the same, and thereby actuate the sliding rod $Y^3$ and its pawl $Y^5$ to turn the ratchet-wheel $Y^6$ and the pointer $Y^7$ for the latter to indicate the next piece of music on the dial Y, the pieces of music on a note-sheet being preferably indicated by numerals on the dial $Y^8$, as shown in Fig. 1. When the pneumatic $Y^2$ inflates, then the sliding rod $Y^3$ returns by the action of the spring $Y^4$. The sliding rod $Y^3$ has a free upward movement to allow the pawl $Y^5$ to glide backward over the ratchet-teeth of the ratchet-wheel $Y^6$, held against return movement by a spring-dog $Y^9$.

The soft and loud pedals Z and $Z'$ of the piano are used to throw the hammer-rail $C'$ and the damper-rail $C^3$ on or off by the operator in the usual manner and whenever desired, and for this purpose the soft pedal Z is secured on a crank-shaft $Z^2$, (see Figs. 3 and 5,) on which rests the lifter-rod $Z^3$, engaging the hammer-rail $C'$ to swing the same rearward on pressing the pedal Z and to allow the hammer-rail $C'$ to return to a position of rest on releasing the pedal Z. In a like manner the loud pedal $Z'$ (see Figs. 3, 5, and 6) is secured on a crank-shaft $Z^4$, on which rests the lifter-rod $Z^5$, engaging the damper-rail $C^3$. When the loud pedal $Z'$ is pressed, the dampers $C^2$ are thrown off the strings A, and when the said pedal $Z'$ is released the dampers $C^2$ move back in contact with the strings A. The middle pedal $Z^6$ when pressed imparts a swinging motion to the lever $Z^8$, engaging a lifter-rod $Z^9$, controlling the muffler $C^6$ in the usual manner. (See Figs. 1$^a$ and 6.)

The operation is as follows: Presuming that the note-sheet L is wound up on the roller N, and extends over the tracker-board K and has its beginning end attached to the roller $N'$ and a coin T is passed by the slide $T^3$ and chute $T'$ between the members $S^4$ $S^5$ of the coin-controlled mechanism S, (see Fig. 23,) now as the motor-circuit is closed by the coin T the motor begins running, and thus actuates the suction-bellows I to draw air out of the suction-chamber $I'$ and out of the motor suction-chamber to start the pneumatic motor $O^5$, which in turn rotates the shaft O and the roller $N'$ for the latter to draw the note-sheet L over the tracker-board K and to wind it up on the roller $N'$. As the note-apertures $L'$ register with the tracker-board openings $K'$ the corresponding pneumatics F, keys D, and hammers C are actuated for the hammers to sound the strings A, thus playing the first piece of music on the note-sheet L. When the first piece of music is played, the note-sheet aperture $L^2$ registers with the tracker-board opening $K^2$, so that air passes into the chamber $Q'$ of the valve mechanism $Q^2$, which connects the stopping-pneumatic $Q^3$ with the suction-chamber $R'$, connected by way of the suction-chamber $G'$ and valve-chest H with the suction-chamber $I'$ of the suction-bellows I, so that the pneumatic $Q^3$ collapses, and thus turns the member $S^4$ of the coin-controlled mechanism to cause the coin T to pass out from between the members $S^4$ and $S^5$, thus breaking the motor-circuit, and thereby bringing the motor $J^5$ to a stop.

It is understood that during the playing of the first piece of music some of the apertures $L^4$ $L^5$ and $L^6$ $L^7$ may register with their corresponding tracker-board openings $K^3$ $K^4$ and $K^5$ $K^6$ for actuating the corresponding valve mechanisms $W^4$, $W^5$, $W^6$, and $W^7$, with a view to play corresponding parts of the music more or less pianissimo or forte, as the case may be and called for by the music.

Whenever the valve mechanism $Q^2$ is actuated, as above described, then the pointer $Y^7$ of the indicator Y moves automatically to the next indicating-numeral on the dial $Y^8$ to indicate the following piece of music. When the next coin is introduced, the above-described operation is repeated, and in a like manner the several pieces of music on the note-sheet L are played in succession whenever a coin T is introduced. When the end portion of the note-sheet passes over the tracker-board K at the end of the last piece of music on the note-sheet, then the transversely-alined note-sheet apertures $L^2$ and $L^3$ register with the tracker-board openings $K^2 K^3$, whereby the valve mechanisms $Q^2$ and $W^4$ are simultaneously actuated to cause the pneumatics V and $Q^3$ to collapse simultaneously to open the valve $V^5$ for collapsing the pneumatic U. The collapsing of the pneumatic $Q^3$ causes a release of the coin T between the members $S^4 S^5$, and hence the first motor-circuit is broken; but as the valve $V^5$ is opened to allow the pneumatic U to collapse it is evident that the second motor-circuit is immediately closed to keep the motor going without the coin T being between the members $S^4$ and $S^5$. The collapsing of the pneumatic U causes a shifting of the shaft O from the right to the left to drive the roller N, so that the note-sheet L is rewound on the roller N and is unwound from the roller N'. When the pneumatic U collapses, the valve $P^3$ is moved into a full-open position, so as to allow a fast running of the pneumatic motor $O^5$ to insure a rapid rewinding of the notesheet. When the pneumatic U collapses, as above described, then air is also drawn out of the pneumatic $H^{11}$ by way of the channel $H^{13}$ and tube $H^{12}$, so that the collapsed pneumatic $H^7$ is unlocked to allow the valve $H^2$ to close by the action of its spring $H^4$ to cut off the connection between the suction-chamber I' and the chest H, so that no air whatever is drawn out of the suction-chambers G' and R' during the rewinding of the note-sheet, and hence the pneumatics F are not actuated on the note-apertures L' registering with the tracker-board openings K' during the rewinding of the note-sheet. When the note-sheet L is almost rewound, then the aperture $L^8$ at the beginning end of the note-sheet registers with the tracker-board opening $K^7$, so that air is admitted to the chamber X' (see Fig. 8) to actuate the diaphragm $X^2$ with a view to shift the valves $X^7$ and $X^9$, as previously explained. When this takes place, air is drawn out of the pneumatic $U^0$ by way of the channel $X^{11}$, so that the pneumatic $U^0$ collapses and in doing so actuates the catch $U^7$ to release the bell-crank lever $U^6$. At the same time the air is drawn out of the pneumatic $U^{13}$ for the latter to open the valve $U^{14}$ to allow the pneumatic U to inflate, so that the shaft O returns to its right-hand side position by the action of the spring $O^7$. When the pneumatic U is inflated, its contact-plate U' moves out of contact with the contact-plates $U^2$, so that the second circuit is broken and the motor $J^5$ ceases running, thus also causing the pneumatic motor $O^5$ to come to a standstill at the time the note-sheet L is completely rewound.

When the air is exhausted from the chamber $X^6$, then air is also drawn out of the pneumatic $H^7$ by way of the channels $X^{13}$ $X^{11}$, so that the pneumatic $H^7$ collapses and in doing so swings the valve $H^2$ back into an open position. At the same time the pneumatic $H^7$ is locked in a collapsed position by the action of the bell-crank lever $H^9$ engaging the pin $H^8$. Thus the several parts of the instrument are returned to their original position, and on the introduction of a coin the above-described operation is repeated.

From the foregoing it will be seen that the piano can be played by hand the same as any ordinary piano and without requiring any changes whatever. If the proper coins are introduced, the several pieces of music on the note-sheet are played in succession, and when the last piece of music is finished the note-sheet is automatically rewound. The rollers N and N' are arranged in the usual manner to permit convenient exchange of note-sheets. By controlling the various devices, except the starting device for the motor, by pneumatic means the instrument is not liable to get easily out of order, and by having the several devices arranged and connected as described and shown ready access is had to any one of the devices to permit proper adjustment thereof and allow convenient repairing.

The coin-controlled apparatus herein described is not claimed in this application, but forms the subject-matter of another application filed under even date herewith.

Having thus described my invention, I claim as new and desire to secure by Letters Patent—

1. A self-playing piano provided with a rewinding mechanism, a pneumatic controlling the said rewinding mechanism, a wind-chest connected with the said pneumatic, a valve for connecting and disconnecting the said pneumatic and wind-chest, a pair of pneumatics, and a mechanism connecting the pair of pneumatics with the said valve to actuate the latter on simultaneously actuating the said pair of pneumatics.

2. A self-playing piano provided with a rewinding mechanism, a pneumatic controlling the said rewinding mechanism, a wind-chest connected with the said pneumatic, a valve for connecting and disconnecting the said pneumatic and wind-chest, a pair of pneumatics, and a mechanism connecting the pair of pneumatics with the said valve to actuate the latter on simultaneously actuating the said pair of pneumatics, the said mechanism allowing individual working of either of the said pneumatics of the pair of pneumatics without affecting the said valve.

3. A self-playing piano provided with a rewinding mechanism, a pneumatic controlling the said rewinding mechanism, a wind-chest connected with the said pneumatic, a valve for connecting and disconnecting the said pneumatic and wind-chest, the said valve having a stem a pair of pneumatics, and a lever fulcrumed on the stem of the said valve and having its ends connected with the said pair of pneumatics to allow the latter to work individually, and when working simultaneously to move the lever bodily to actuate the valve.

4. A self-playing piano provided with a rewinding mechanism, a pneumatic controlling the said rewinding mechanism, a wind-chest connected with the said pneumatic, a valve for connecting and disconnecting the said pneumatic and wind-chest, the said valve having a stem a lever fulcrumed between its ends on the stem of the said valve, a spring pressing the said valve to hold it normally closed, and a pair of pneumatics loosely connected with the ends of the said lever to allow individual working of the pneumatics of the pair of pneumatics and to move the said lever bodily to open the valve on actuating the pair of pneumatics simultaneously.

5. A self-playing piano provided with a note-sheet, a tracker-board, rollers for winding up and rewinding the said note-sheet, separate gearings for driving the said rollers and provided with clutch members, a driven shaft having a clutch member for engagement with either of the said gearing clutch members, a pneumatically-controlled shifting device for shifting the said driven shaft in the direction of its length to move the shaft clutch member out of engagement with one of the gearing clutch members and into engagement with the other gearing clutch member, and a pneumatically-controlled locking device for the said shifting device, the said note-sheet having apertures controlling the tracker-board openings to the said devices.

In testimony whereof I have signed my name to this specification in the presence of two subscribing witnesses.

HERMANN MEYER.

Witnesses:
 THEO. G. HOSTER,
 EVERARD B. MARSHALL.